US011724404B2

(12) United States Patent
Telleria et al.

(10) Patent No.: US 11,724,404 B2
(45) Date of Patent: Aug. 15, 2023

(54) SURFACE FINISH QUALITY EVALUATION SYSTEM AND METHOD

(71) Applicant: Canvas Construction, Inc., San Francisco, CA (US)

(72) Inventors: Maria J. Telleria, Menlo Park, CA (US); Kevin B. Albert, San Francisco, CA (US); Irene M. Davis, Daly City, CA (US); Henry Tonoyan, San Francisco, CA (US); Gabriel F. Hein, Albany, CA (US); Zelda Othenin-Girard, San Francisco, CA (US); Jason De Alba, Richmond, CA (US)

(73) Assignee: Canvas Construction, Inc., San Francisco, CA (US)

( * ) Notice: Subject to any disclaimer, the term of this patent is extended or adjusted under 35 U.S.C. 154(b) by 397 days.

(21) Appl. No.: 16/798,029

(22) Filed: Feb. 21, 2020

(65) Prior Publication Data

US 2020/0269439 A1 Aug. 27, 2020

Related U.S. Application Data

(60) Provisional application No. 62/808,631, filed on Feb. 21, 2019.

(51) Int. Cl.
| B25J 15/00 | (2006.01) |
| E04F 21/08 | (2006.01) |
| G06T 7/40 | (2017.01) |
| B25J 11/00 | (2006.01) |

(Continued)

(52) U.S. Cl.
CPC ......... *B25J 15/0019* (2013.01); *B25J 9/1697* (2013.01); *B25J 11/0075* (2013.01); *E04F 21/08* (2013.01); *G06T 7/0002* (2013.01); *G06T 7/40* (2013.01)

(58) Field of Classification Search
CPC .. B25J 11/0075; B25J 9/1697; B25J 15/0019; E04F 21/08; G06T 7/0002; G06T 7/40
See application file for complete search history.

(56) References Cited

U.S. PATENT DOCUMENTS

| 2,088,542 A | 7/1937 | Westin |
| 2,514,748 A | 7/1950 | Di Stefano |
| 3,116,882 A | 1/1964 | Vork |

(Continued)

FOREIGN PATENT DOCUMENTS

| CN | 1611331 A | * | 5/2005 |
| CN | 2883554 Y |   | 3/2007 |

(Continued)

OTHER PUBLICATIONS

Unknown, Method of Tuning Parameters for Compliant Motion Tasks in Robot Programming, IBM Technical Disclosure Bulletin, pp. 21-22 (Year: 1992).*

(Continued)

*Primary Examiner* — Jermie E Cozart
(74) *Attorney, Agent, or Firm* — Akona IP

(57) ABSTRACT

A surface evaluation system that includes one or more vision systems that generate target surface data during evaluation of a surface, the one or more vision systems comprising two or more of: at least one light, a camera, a structured light camera, a laser scanner and a 3D scanner.

20 Claims, 11 Drawing Sheets

(51) Int. Cl.
*G06T 7/00* (2017.01)
*B25J 9/16* (2006.01)

(56) References Cited

U.S. PATENT DOCUMENTS

| | | | |
|---|---|---|---|
| 4,392,336 | A | 7/1983 | Ganssle |
| 4,941,182 | A | 7/1990 | Patel |
| 5,175,018 | A | 12/1992 | Lee et al. |
| 5,279,700 | A | 1/1994 | Retti |
| 5,429,682 | A | 7/1995 | Harlow, Jr. et al. |
| 5,670,202 | A | 9/1997 | Guzowski et al. |
| 5,979,520 | A | 11/1999 | Behrendt |
| 5,987,591 | A * | 11/1999 | Jyumonji .............. B25J 9/1697 700/259 |
| 6,112,490 | A | 9/2000 | Meyer |
| 6,149,506 | A | 11/2000 | Duescher |
| 6,712,238 | B1 | 3/2004 | Mills |
| 7,551,058 | B1 | 6/2009 | Johnson et al. |
| 9,243,412 | B1 | 1/2016 | Gallette et al. |
| 9,427,874 | B1 | 8/2016 | Rublee |
| 9,518,870 | B2 | 12/2016 | Verdino |
| 9,527,211 | B2 | 12/2016 | Posselius et al. |
| 9,637,936 | B1 | 5/2017 | Gallette et al. |
| 9,694,381 | B2 | 7/2017 | Mohr |
| 9,702,830 | B1 | 7/2017 | Akselrod et al. |
| 9,849,594 | B2 | 12/2017 | Keese |
| 9,995,047 | B2 | 6/2018 | Raman et al. |
| 10,478,972 | B2 | 11/2019 | Lipinski et al. |
| 10,513,856 | B2 | 12/2019 | Telleria et al. |
| 10,526,799 | B2 | 1/2020 | Telleria et al. |
| 10,697,188 | B2 | 6/2020 | Telleria et al. |
| 10,718,119 | B2 | 7/2020 | Telleria et al. |
| 10,822,814 | B2 | 11/2020 | Telleria et al. |
| 10,870,996 | B2 | 12/2020 | Telleria et al. |
| 11,059,065 | B2 | 7/2021 | Holloway et al. |
| 11,077,457 | B2 | 8/2021 | Lipinski et al. |
| 11,230,008 | B2 | 1/2022 | Schweigler |
| 2004/0159724 | A1 | 8/2004 | van der Steur |
| 2005/0064804 | A1 | 3/2005 | Cecil et al. |
| 2005/0120840 | A1 | 6/2005 | Koskovich |
| 2006/0108450 | A1 | 5/2006 | Klinkenberg et al. |
| 2007/0000947 | A1 | 1/2007 | Lewis et al. |
| 2007/0107632 | A1 | 5/2007 | Ball |
| 2007/0151201 | A1 | 7/2007 | Fellinger |
| 2008/0168741 | A1 | 7/2008 | Gilgan et al. |
| 2009/0199690 | A1 | 8/2009 | Sun et al. |
| 2010/0010660 | A1 | 1/2010 | Salour et al. |
| 2010/0098871 | A1 | 4/2010 | Gale et al. |
| 2010/0307279 | A1 | 12/2010 | Campagna et al. |
| 2011/0011222 | A1 | 1/2011 | Bales |
| 2011/0211938 | A1 | 9/2011 | Eakins et al. |
| 2011/0253291 | A1 | 10/2011 | Allen et al. |
| 2011/0302877 | A1 | 12/2011 | Gilgan et al. |
| 2012/0219699 | A1 | 8/2012 | Pettersson et al. |
| 2012/0316930 | A1 | 12/2012 | Clemenson |
| 2013/0042480 | A1 | 2/2013 | Turulin |
| 2013/0167471 | A1 | 7/2013 | Denaro |
| 2013/0239498 | A1 | 9/2013 | Owens |
| 2013/0260016 | A1 | 10/2013 | Georgeson et al. |
| 2014/0022281 | A1 | 1/2014 | Georgeson et al. |
| 2014/0230726 | A1 | 8/2014 | Gale et al. |
| 2014/0336818 | A1 | 11/2014 | Posselius et al. |
| 2015/0112482 | A1 | 4/2015 | Kuwahara |
| 2015/0147460 | A1 | 5/2015 | Manzi et al. |
| 2015/0336267 | A1 | 11/2015 | Sun et al. |
| 2015/0350618 | A1 | 12/2015 | Meier et al. |
| 2015/0375390 | A1 | 12/2015 | Becroft et al. |
| 2016/0052012 | A1 | 2/2016 | Mohr |
| 2016/0121486 | A1 | 5/2016 | Lipinski et al. |
| 2016/0207220 | A1 | 7/2016 | Hack et al. |
| 2016/0313294 | A1 | 10/2016 | Dattilo et al. |
| 2017/0052507 | A1 | 2/2017 | Poulos et al. |
| 2018/0009000 | A1 | 1/2018 | Shang et al. |
| 2018/0021799 | A1 | 1/2018 | Raman et al. |
| 2018/0223546 | A1 | 8/2018 | Wasserfaller, Sr. |
| 2018/0281012 | A1 | 10/2018 | Telleria et al. |
| 2018/0283018 | A1 | 10/2018 | Telleria et al. |
| 2019/0118209 | A1 * | 4/2019 | Rennuit ................ B25J 9/1671 |
| 2019/0255551 | A1 | 8/2019 | Hargadon |
| 2020/0061866 | A1 | 2/2020 | Giles |

FOREIGN PATENT DOCUMENTS

| | | | |
|---|---|---|---|
| CN | 202023345 U | | 11/2011 |
| CN | 105971253 A | | 9/2016 |
| CN | 106088544 A | | 11/2016 |
| DE | 102006056179 A1 | | 6/2008 |
| GB | 2171222 A | | 8/1986 |
| IT | M020100102 A1 | | 10/2011 |
| JP | H03100265 A | | 4/1991 |
| JP | H04169659 A | | 6/1992 |
| JP | H04258468 A | | 9/1992 |
| JP | H06269709 A | | 9/1994 |
| JP | H0766585 A | | 3/1995 |
| JP | 2645312 B2 | | 8/1997 |
| JP | H10180178 A | | 7/1998 |
| JP | 2010203055 A | | 9/2010 |
| JP | 5107123 B2 | | 12/2012 |
| JP | 2017109294 A | | 6/2017 |
| JP | 2019167678 A | | 10/2019 |
| JP | 6713762 B2 | | 6/2020 |
| KR | 20090085809 A | | 8/2009 |
| KR | 101131918 B1 | | 4/2012 |
| RU | 1789711 C | | 1/1993 |
| RU | 2100686 C1 | | 12/1997 |
| RU | 2686421 C1 | | 4/2019 |
| SU | 00160667 | | 11/1963 |
| WO | 2007141320 A1 | | 12/2007 |
| WO | 2013000524 A1 | | 1/2013 |
| WO | 2016200439 A1 | | 12/2016 |
| WO | WO-2017187105 A1 * | 11/2017 | ............. B05B 12/00 |
| WO | 2018183961 A1 | | 10/2018 |
| WO | 2018226533 A1 | | 12/2018 |

OTHER PUBLICATIONS

Google Translation of CN 1611331A (Year: 2005).*
Alex et al., "Automated Surface Profiling of Drywall Surface for Sanding," 28th International Symposium on Automation and Robotics in Construction, Jun. 2011, 7 pages.
Bao et al., "Flexible Pneumatic End-effector for Agricultural Robot: Design & Experiment," Proceedings of the 2015 IEEE Conference on Robotics and Biomimetics, Dec. 6, 2015, 6 pages.
Fanuc America Corporation, "Robotic Sanding, Washing & Drying An Aircraft Fuselage with Fanuc's New P-350iA/45 Robot," Oct. 27, 2016, retrieved from https://www.youtube.com/watch?v=abA9v8EOokl, 4 pages.
Forsberg et al., "A Construction Robot for Autonomous Plastering of Walls and Ceilings," Jun. 11, 1997, retrieved Aug. 8, 2019, from http://www.iaarc.org/publications/fulltext/A_construction_robot_for_autonomous_plastering_of_walls_and_ceilings.PDF, 9 pages.
International Search Report and Written Opinion dated Aug. 2, 2018, International Patent Application No. PCT/US2018/025570, filed Mar. 30, 2018, 7 pages.
International Search Report and Written Opinion dated Feb. 28, 2019, International Patent Application No. PCT/US2018/052751, filed Sep. 25, 2018, 7 pages.
International Search Report and Written Opinion dated Jul. 5, 2018, International Patent Application No. PCT/US2018/025529, filed Mar. 30, 2018, 7 pages.
International Search Report and Written Opinion dated Jul. 5, 2018, International Patent Application No. PCT/US2018/025536, filed Mar. 30, 2018, 7 pages.
International Search Report and Written Opinion dated Jul. 5, 2018, International Patent Application No. PCT/US2018/025553, filed Mar. 30, 2018, 7 pages.
International Search Report and Written Opinion dated Jul. 5, 2018, International Patent Application No. PCT/US2018/025556, filed Mar. 30, 2018, 7 pages.

(56) References Cited

OTHER PUBLICATIONS

International Search Report and Written Opinion dated Jul. 5, 2018, International Patent Application No. PCT/US2018/025566, filed Mar. 30, 2018, 7 pages.

International Search Report and Written Opinion dated May 28, 2020, in International Patent Application No. PCT/US2020/019347, filed Feb. 21, 2020, 9 pages.

Jahangiri, "Generating Optimized Cutting Layouts of Drywall Panels Using Building Information," Master of Science Thesis Texas A&M University, May 2016, 68 pages.

Jeremy56 et al., "Cannot get my drywall into the basement," DIYChatroom.com, https://www.diychatroom.com/threads/cannot-get-my-drywall-into-the-basement.7454/, Mar. 30, 2007, 9 pages.

Krieg, "HygroSkin—Meteorosensitive Pavilion," Fabricate 2014: Negotiating Design and Making, Feb. 2014, https://www.researchgate.net/publication/273060832_HygroSkin_-_Meteorosensitive_Pavilion, 9 pages.

Nagata et al., "Robotic sanding system for new designed furniture with free-formed surface," Robotics and Computer-Integrated Manufacturing 23(4):371-379, Aug. 2007.

Pelletier, "Carpet Seam Peaking", PelletierRug.com, https://www.pelletierrug.com/carpet-seam-peaking.php, 2012, 2 pages.

Supplementary European Search Report issued in EP Patent Application No. 18774804.1, dated Dec. 4, 2020, 6 pages.

Supplementary European Search Report issued in EP Patent Application No. 18776196.0, dated Dec. 9, 2020, 8 pages.

Supplementary European Search Report issued in EP Patent Application No. 18777789.1, dated Dec. 8, 2020, 9 pages.

Tuberville Enterprizes, "Walls & Ceilings Joint Compund Additive," Jun. 5, 2012, retrieved Aug. 8, 2019, from https://www.wconline.com/articles/88003-joint-compound-additive, 1 page.

Ueno et al., "Construction Robots for Site Automation," CAD & Robotocs in Architecture & Construction, 1986, 13 pages.

Yoshida et al., "Development of Spray Robot for Fireproof Cover Work," 1984, 27 pages.

Japan IPO Office Action dated Oct. 28, 2022 in Application No. 2020-538772, 3 pages.

Supplementary European Search Report issued in EP Patent Application No. 20760348.1, dated Sep. 19, 2022, 10 pages.

\* cited by examiner

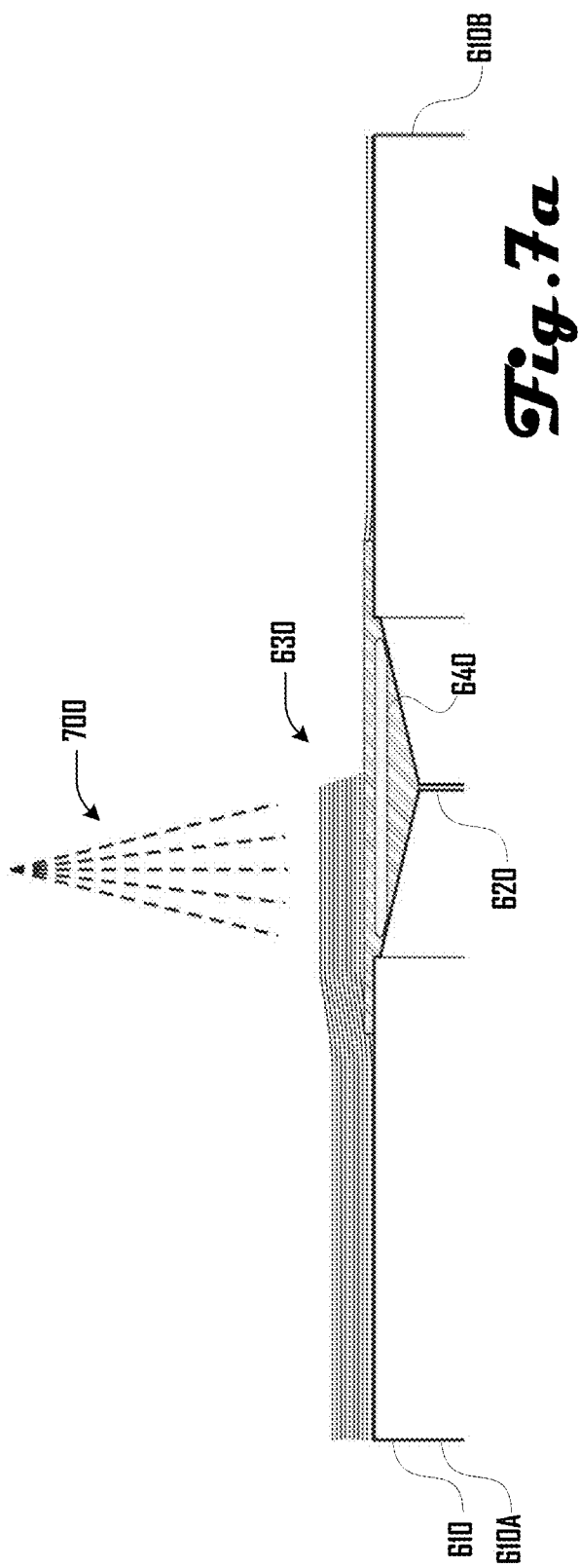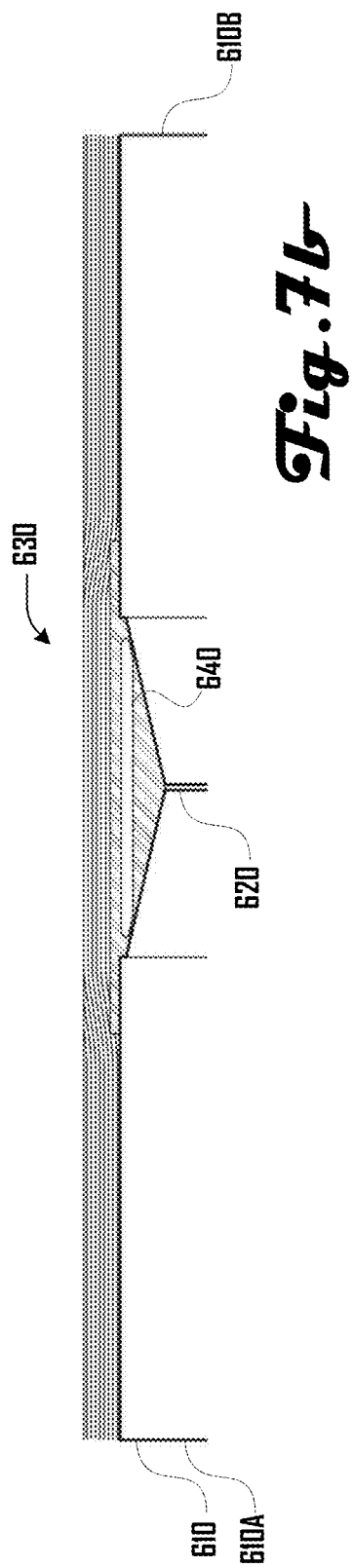

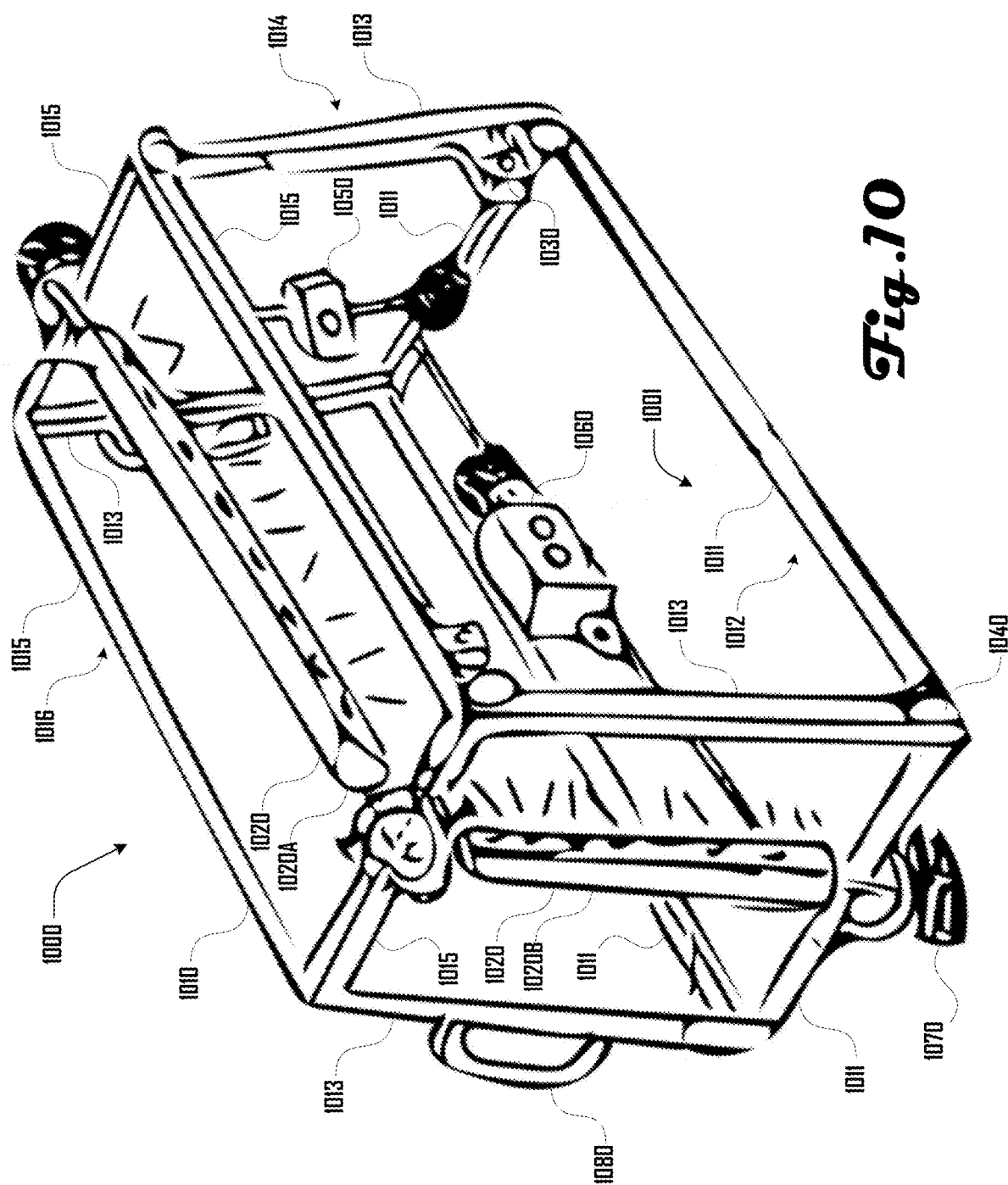

SURFACE FINISH QUALITY EVALUATION SYSTEM AND METHOD

CROSS-REFERENCE TO RELATED APPLICATIONS

This application is a non-provisional of, and claims the benefit of U.S. Provisional Application No. 62/808,631, filed Feb. 21, 2019, which application is hereby incorporated herein by reference in its entirety and for all purposes.

This application is also related to U.S. Non-provisional applications filed contemporaneously herewith having respective application Ser. Nos. 15/942,158, 15/942,193, 15/941,886, 15/942,318, 15/942,087, 15/942,286, 15/941,974 and 16/141,791 and respectively entitled "AUTOMATED DRYWALL PLANNING SYSTEM AND METHOD," "AUTOMATED DRYWALL CUTTING AND HANGING SYSTEM AND METHOD," "AUTOMATED DRYWALL MUDDING SYSTEM AND METHOD," "AUTOMATED DRYWALL SANDING SYSTEM AND METHOD," "AUTOMATED DRYWALL PAINTING SYSTEM AND METHOD," "AUTOMATED DRYWALLING SYSTEM AND METHOD," "AUTOMATED INSULATION APPLICATION SYSTEM AND METHOD" and "AUTOMATED WALL FINISHING SYSTEM AND METHOD" These applications are hereby incorporated herein by reference in their entirety and for all purposes.

BRIEF DESCRIPTION OF THE DRAWINGS

FIGS. 7a and 7b illustrate an embodiment of an automated compound application process where the joint compound is applied in a thick layer using a sprayer.

FIG. 10 illustrates an example embodiment of a surface evaluation system composed of one or more cameras, scanners, and lights mounted to a frame.

Figure 1:
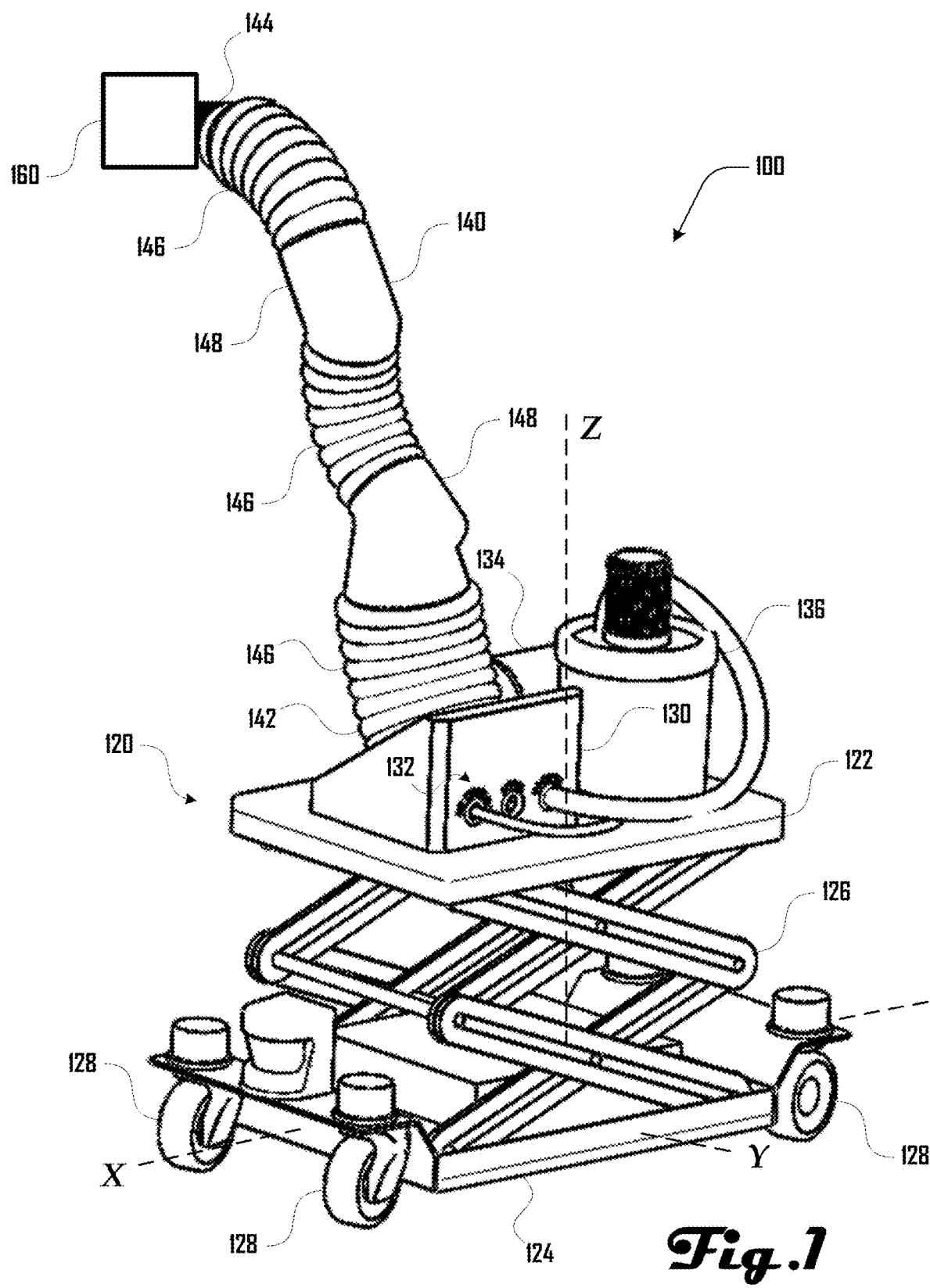
FIG. 1 is an exemplary perspective drawing illustrating an embodiment of an automated surface installation and finishing system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

In one aspect, this disclosure pertains to a method and system for evaluating the finish quality of plaster, gypsum, stucco, cement, paint or another finished surface. One embodiment of the surface quality evaluation system can be as part of a larger autonomous finishing system. The full system can comprise a mobile base with a vertical lift that positions a robotic manipulator and surface evaluation system relative to a target surface. The mobile base and stage may be instrumented with sensors to aid in the positioning of the system including Lidar, cameras, GPS, IMU, radar, range finders, encoders, stereo cameras, structured light cameras, optoelectrical sensors, hall effect sensors, among others. A surface evaluation end effector may be used in the system to position cameras, lights and other sensors relative to the target surface. The robotic manipulator may be used to control the angle and distance of the sensors relative to the target surface. The mobile base may be instrumented with sensors and lights to evaluate the finish of the surface. The surface may be evaluated before, during and after the task.

The finish quality may be evaluated by the surface roughness, sheen, reflectivity, planarity, texture, porosity, number and size of defects, or any other suitable measurement. The method may be used to establish a correlation between any of these measurements and what is visually appealing to the eye. The method may find a measurement or set of measurements that establish the quality of finish as perceived by the human eye. The system, in various embodiments, can comprise any suitable sensors, light sources, instruments, control units, and positioning mechanisms required to evaluate the finish quality.

The finish quality may be established using a variety of sensors including but not limited to RGB cameras, stereo cameras, structured light cameras, profilometry sensors, thermal cameras, laser measurements, conductivity sensors, 3D scanners, reflectivity sensors, and time of flight sensors. These sensors can each be used on their own or as a group to establish the surface quality. One sensor may also be used to calibrate a separate sensor. This may be done in some examples to utilize cheaper, faster, more robust, larger field of view, or less accurate sensors in the field.

In various embodiments, a finish quality evaluation system may be part of a mobile unit which may include a mobile base with a robotic manipulator, a positioning stage, and the like. The entire system or parts of the system may be mounted on the robot manipulator in some examples as an end effector to allow the robot to position the system relative to the target surface.

The entire system or parts of the system may be mounted on the mobile base as the base moves along the surface different measurements and images can be taken. The base may be used to control the distance to the target surface, the angle of the sensors or lights relative to the surface and the overlap between subsequent measurements. The mobile base may include a positioning stage that raises a platform vertically relative to the floor. The entire system or parts of the system may be mounted on the platform that is moved by the vertical stage, enabling the system to take measurements at different heights along a surface or to take measurements on a ceiling or other raised surface. The mobile base and vertical stage may be used to take multiple measurements across a surface scanning the surface to establish a surface quality measurement and to identify features, imperfections, and areas that require rework. The mobile base may be used to position the system at different angles and distances from the same target area collecting images and/or measurements at each of these positions. The sensors and lights may be mounted on additional stages individually or as a group to allow for the angle of the sensors and lights relative to each other to be changed and controlled.

In some embodiments, a finish quality evaluation system can be mounted entirely or in part on a handheld unit that an operator or worker can position relative to a target surface. In further embodiments, a finish quality evaluation system can be mounted entirely or in part on a floor stand that an operator can place in the vicinity of a one or more target surfaces. In still further embodiments, a finish quality evaluation system can be mounted entirely or in part on personal protective equipment, vest, or another article worn by an operator.

In another aspect, the following disclosure pertains to an automated drywalling finishing system, which in some embodiments can be used for generating a wall, finishing a wall, evaluating the finish of a wall, or the like. Further examples can be used for drywalling, including one or more of planning a configuration and location of drywall pieces on a wall assembly, cutting drywall pieces, hanging drywall pieces, performing mud work on hung drywall pieces, performing sanding on mudded drywall pieces, painting sanded drywall pieces, and evaluating a finish of the drywall pieces at one or more of such drywalling stages.

Various aspects of the present disclosure pertain to a surface finishing system and method for spraying plaster, stucco, parex, gypsum, or the like, over a porous substrate material to create a wall. In some examples, the substrate material can comprise mesh, paper, cloth surface, lath, buttonboard, rock lath, rainscreen, drywall board, a porous surface, or the like. The substrate material can be flexible to follow curved or complex contours in various examples. The material may be transported in rolls or sheets and fastened to load bearing structures to generate a portion of a wall. The substrate can also comprise a woven structural cabler, woven electrical cables, or the like. The substrate can be instrumented with sensors that measure humidity, temperature, conductivity, sound, and the like, which can be used to provide feedback during the spraying process; to serve as in wall-sensors for detection of leaks in the walls, temperature and humidity of the room, environmental problems; or for other suitable purposes.

In accordance with a finishing method of one embodiment, a substrate is attached to wood, metal, concrete or any structural material and a coating is sprayed onto the substrate. The coating material can comprise plaster, gypsum, concrete, stucco or other suitable mineral formulation. The coating may also comprise polymers such as latex and acrylics, as well as adhesion additives including glue and other bonding agents. The coating can comprise a synthetic material such as Parex, an acrylic synthetic stucco, or the like.

One aspect pertains to systems and methods for automated mixing, delivering, applying, curing, and/or drying coatings onto a substrate. In one embodiment, an automated surface finishing system can be used to mix, deliver, apply, and dry coatings onto porous substrates along with evaluation of the same. The automated surface finishing system can be used to apply tape on seams between substrate edges, apply coating or plaster onto the tape and substrate, expedite the drying process, or any combination of these processes.

The automated surface finishing system can also be used to apply the coating and achieve and identify any level of drywall finish including between level 0 and level 5. The automated surface finishing system can utilize joint compound known as mud or setting type compound also known as hot mud. It can also utilize plaster, gypsum, polymer coatings, or the like in some example. Joint compound as discussed herein can encompass pre-mixed, topping, taping, multi-use, all-purpose, and setting type compounds. The automated surface finishing system can also be used with other coatings including plaster, cement, stucco, and paint applied onto drywall, lath, mesh or another suitable substrate. The automated surface finishing system can cover how the coating is prepared, how it is delivered onto the substrate and how it is set, cured or dried along with evaluation of the same.

The methods described in this disclosure can be conducted manually or automatically using an automated system. The automated system can comprise a robotic manipulator, vision system, tool for cutting a substrate, tool for attaching the substrate to the structural material, measurement system, mobile cart, coating material pump, powered finishing tools, power sprayer and any combination of these components. The robotic arm and mobile base can be driven using pressurized fluids, electric motors, cable drives, belt drives, solenoids, voice coils, or any suitable combination of power source. The automated surface finishing system can be electrically or gas powered; it may also utilize pressurized fluid from an external source. The automated system can also take the form of a gantry, where a tool is positioned using an x-y-z stage. The tool-holder can have additional degrees of freedom to orient a tool or end effector or change the position of the tool.

The automated systems and methods disclosed can encompasses all or any of the steps of preparing for, generating, finishing and evaluating the finish of a wall assembly or other portions of a structure, from planning the layout of the substrate material, to attaching the substrate to structural members, to spraying a coating, finishing the coating, and evaluating the finish of the coating. Finishing steps can include but are not limited to troweling, sanding, polishing, knocking-down, applying a texture finish, smoothing, compacting, leveling, floating, edging, cutting grooves or expansion gaps, painting, stenciling, and the like. The automated system can be used to control the finishing tools allowing for controlled material application, removal, finishing, and surface evaluation.

A vision system, measurement sensors, and/or model of a room or structure can be used to determine how a substrate material should be cut to cover the surface. The vision system (which can comprise one or more camera, LIDAR, radar, sonar, or the like), can be used to create a model of the structural material including studs and determine how the system should be used to cover the structures with the substrate and the coating. The automated system can utilize a computational planner that utilizes one or both of the models captured by the vision system and the building plan to determine how the automated system will perform all or any of the steps in a sprayed-on walls process. The automated system can be used to cut, trim, and/or finish the edges of the substrate material. The layout of the substrate can be optimized to minimize the number of breaks or seams in the substrate or to control the location of seams. The substrate material can be hung or attached to the structure manually or using the automated system. The substrate can be attached by nails, screws, staples, glue, anchors or any other suitable fixing component. The substrate material may be overlapped at breaks or can generate seams.

Figure 2:
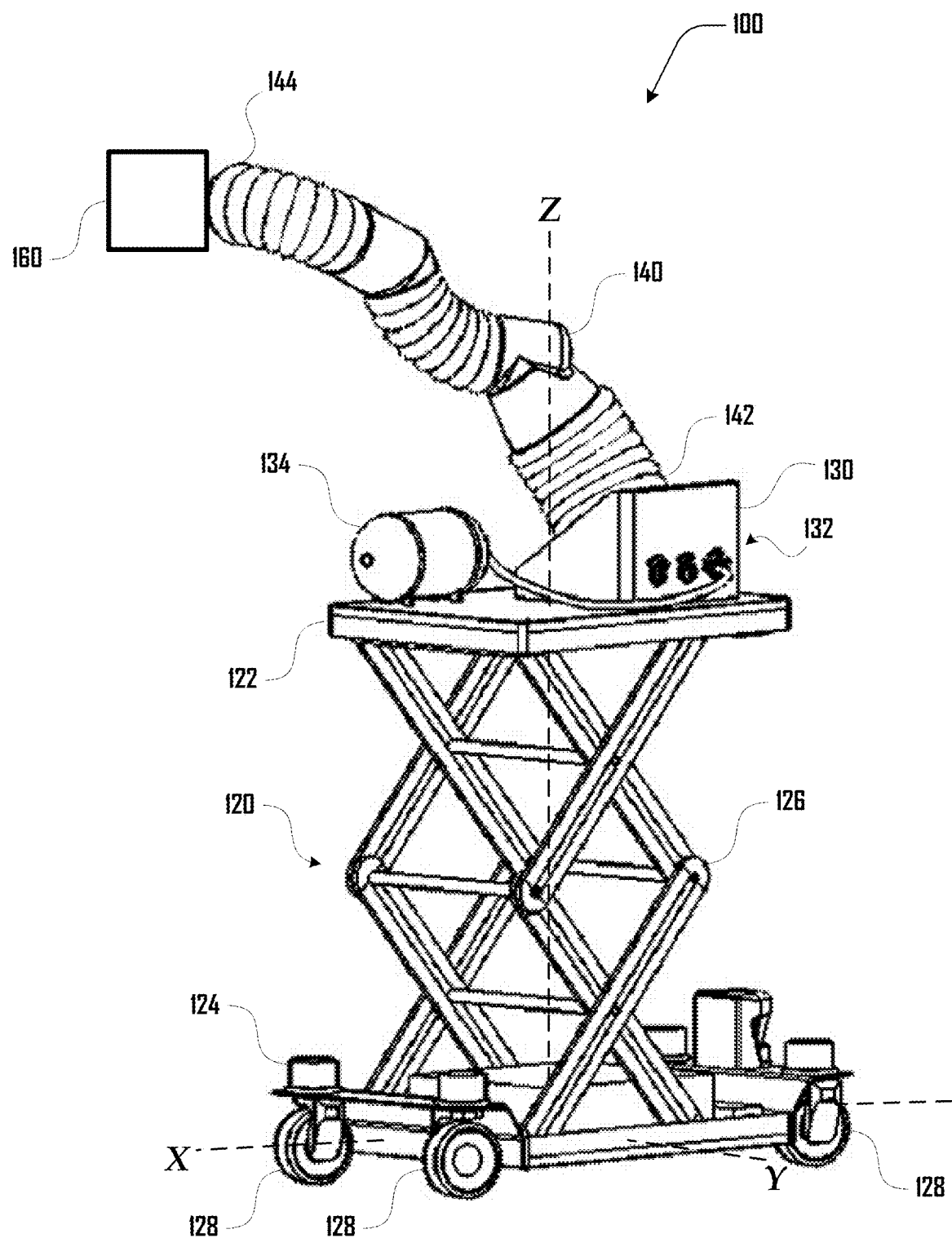
FIG. 2 is an exemplary perspective drawing illustrating another embodiment of an automated wall finishing system.

Turning to FIGS. 1 and 2, examples of an automated surface finishing system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and surface finishing system 100 on the ground in the XY plane. Such movement can be motorized or can be non-motorized. For example, in some embodiments, the surface finishing system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the surface finishing system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a coating or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm, manipulator or positioning stage system, which can include pneumatic actuators, electric actuators, and the like. The robotic arm 140 can have any suitable number of degrees of freedom. Although the examples of FIGS. 1 and 2 illustrate an example having pneumatic actuator units 146 separated by arm couplers 148, this example configuration should not be construed to be limiting on the wide variety of robotic arms 140, manipulators or positioning stages that are within the scope and spirit of the present disclosure.

As discussed in more detail herein, an end effector 160 can be coupled at the distal end 144 of the robotic arm 140.

In some examples, the automated surface finishing system 100 can comprise modular and/or multi-use end effectors 160, which can be configured for various drywalling, construction, or other tasks such as evaluation of surfaces and/or finish of surfaces. For example, as discussed herein, end effectors 160 can be configured for substrate planning, substrate hanging, applying coating or joint compound to hung substrate, sanding the coating, painting, evaluating a surface, evaluating a finish of a surface, and the like. Although various examples herein relate to drywalling and construction, further embodiments of the surface finishing system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
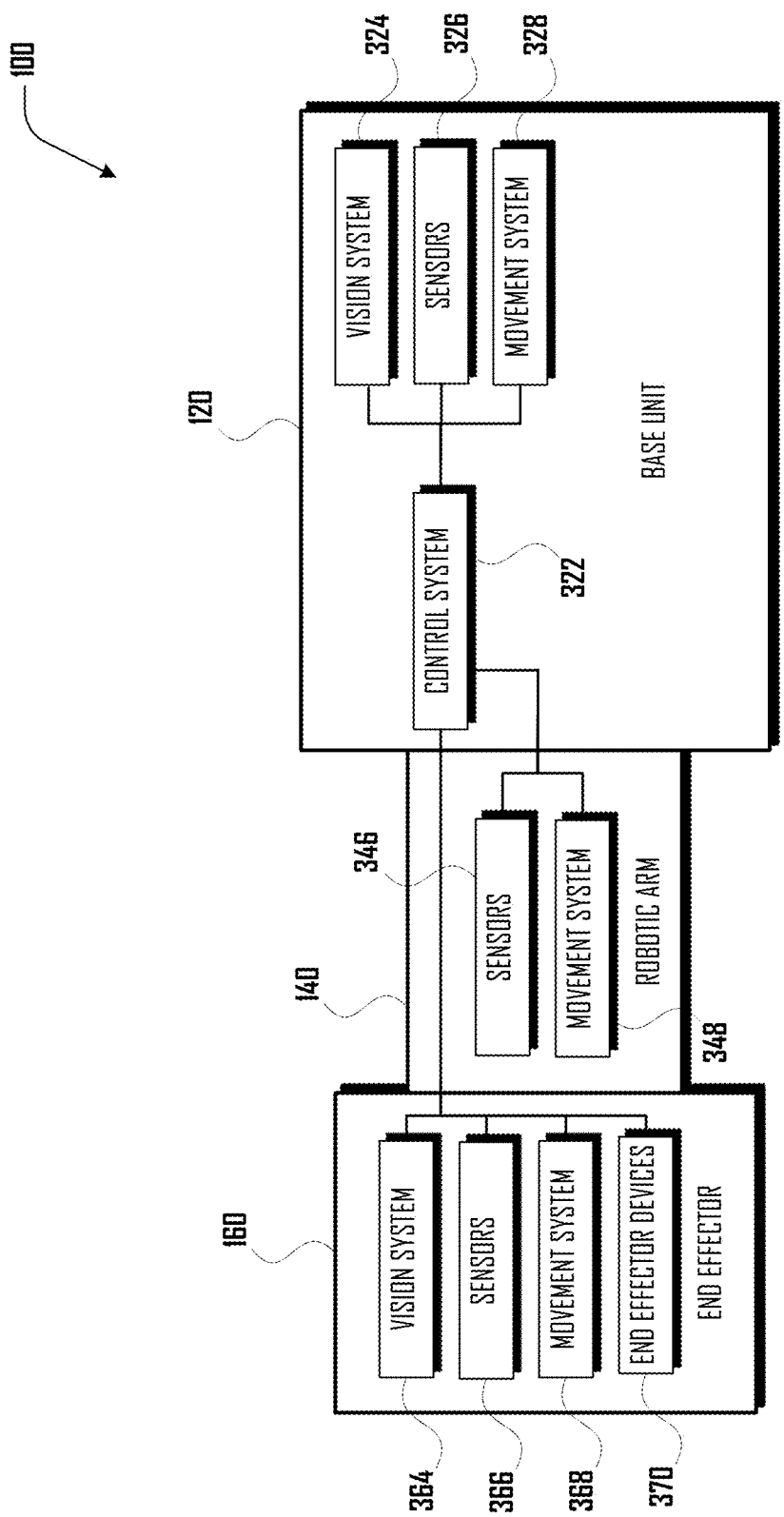
FIG. 3 is an exemplary block diagram illustrating systems of an automated wall finishing system in accordance with one embodiment.

Turning to FIG. 3, a block diagram of a surface finishing system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiments, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, coating device, sanding device, painting device, vacuum device, surface evaluation device, and the like. Other suitable devices can be part of an end effector 160 and can be selected based on any desired task that the end effector 160 may be used for.

As discussed in more detail herein, the control system 322 can receive data from the vision systems 324, 364 and sensors 326, 346, 366 and can drive the movement systems 328, 348, 368 and one or more end effector devices 370 to perform various tasks including substrate planning, substrate hanging, applying coating or joint compound to hung substrate, sanding the coating, painting, and the like. Accordingly, the control system 322 can drive the surface finishing system 100 to perform various suitable tasks, with some or all portions of such tasks being automated and performed with or without user interaction. The control system can comprise various suitable computing systems, including one or more processor and one or more memory storing instructions that if executed by the one or more processor, provide for the execution of tasks by the automated surface finishing system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and or end effector 160.

Figure 4:
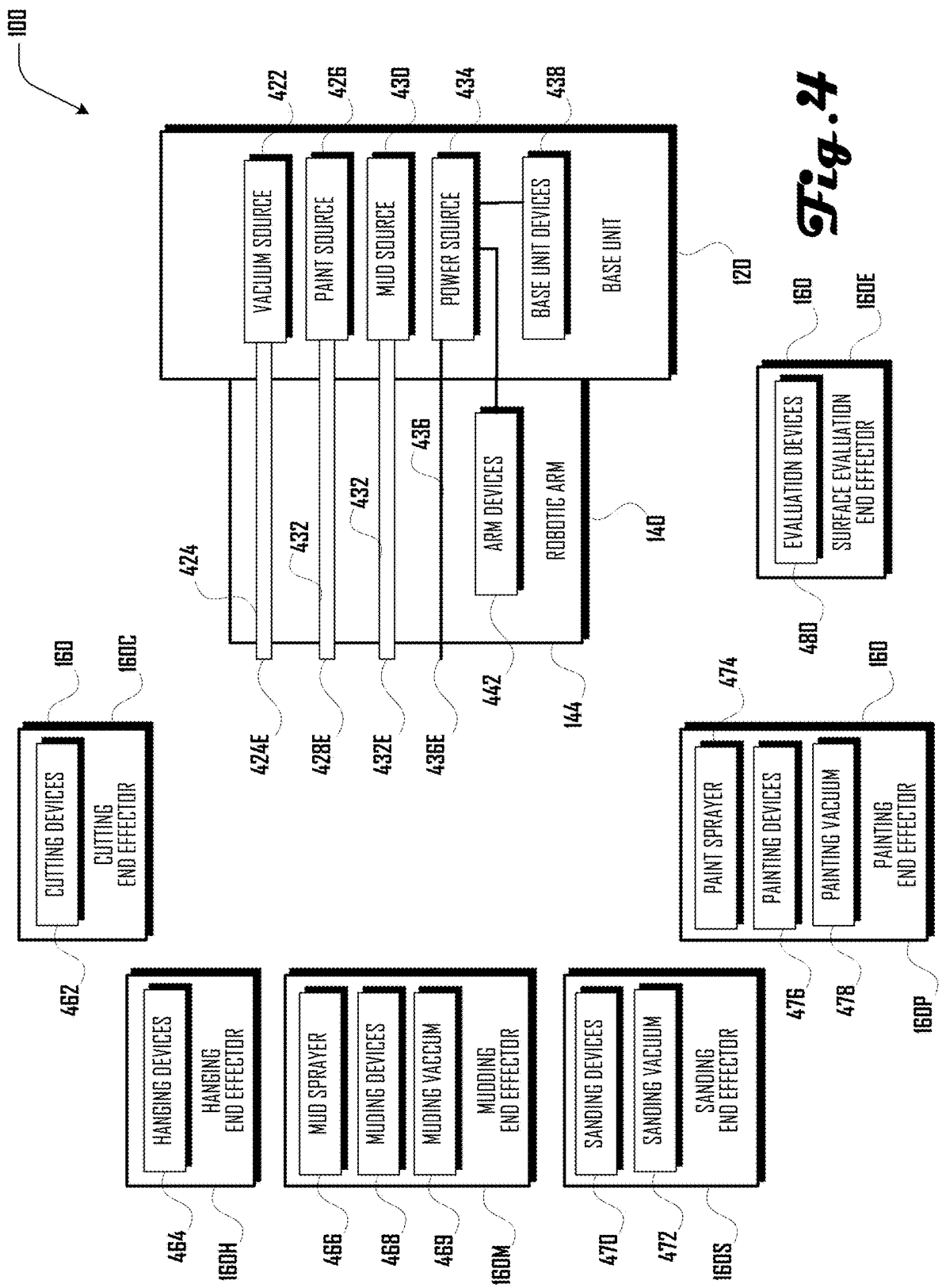
FIG. 4 is an exemplary block diagram illustrating systems of an automated wall finishing system in accordance with one embodiment, including a plurality of end effectors configured to couple to an end of a robotic arm.

Turning to FIG. 4, an exemplary block diagram illustrating systems of an automated surface finishing system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a coating end effector 160M, a sanding end effector 160S; a painting end effector 160P and a surface evaluation end effector 160E.

As shown in FIG. 4, the base unit 120 can comprise a vacuum source 422, a paint source 426, a coating source 430, a power source 432, and one or more base unit devices 438. In various embodiments, one or more of the vacuum source 422, paint source 426, coating source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The coating source 430 can be coupled with a coating tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the surface finishing system 100 to be powered by local power at a worksite via a wall receptacle, generator, external batteries, or the like. However, in some embodiments, the automated surface finishing system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated surface finishing system 100 can be configured to perform a plurality of tasks related to installing and finishing surfaces in construction along with evaluation of such surfaces. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, coating end effector 160M, sanding end effector 160S, painting end effector 160P and surface evaluation end effector 160E can be selectively coupled with the robotic arm 140 at the distal end 144 to perform respective tasks or portions of tasks related to surface finishing and/or evaluation thereof.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated surface finishing system 100 to cut substrates or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated surface finishing system 100 to hang substrate, assist with substrate hanging, or the like.

The coating end effector 160M can alternatively be coupled at the distal end 144 of the robotic arm 140 and coupled with the power line 436 to power coating devices 466 and/or coating applicators 468 of the coating end effector 160M. The coating end effector 160M can be controlled by the automated surface finishing system 100 to perform "mudding" or "coating work" associated with surface finishing, including application of joint compound (also known as "mud") to joints between pieces of hung substrate, and the like. Additionally, the coating end effector can also be configured to apply joint tape, or the like. Additionally, the coating end effector 160M can comprise a coating vacuum 469 that is coupled to vacuum source 422 via the vacuum line 424 to ingest excess joint compound or coating generated by the coating end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated surface finishing system 100 to sand coatings, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474, painting devices 476, and/or painting vacuum 478 of the painting end effector 160P. The painting end effector 160P can be controlled by the automated surface finishing system 100 to paint drywall or other surfaces. Additionally, the painting end effector 160P can comprise a painting vacuum 478 that is coupled to vacuum source 422 via the vacuum line 424 to ingest excess paint spray generated by painting done by the painting end effector 160P.

The surface evaluation end effector 160E can alternatively be coupled at the distal end 144 of the robotic arm 140 and coupled with the power line 436 to power one or more evaluation devices 480 of the surface evaluation end effector 160E. The surface evaluation end effector 160E can be controlled by the automated surface finishing system 100 to evaluate the surface of drywall or other surfaces. For example, the surface evaluation end effector 160E can be configured evaluation of surfaces including the finish of drywall or other surfaces.

While some examples include a surface evaluation end effector 160E that is coupled at the distal end 144 of the robotic arm 140 separately from other end effectors 160 or without other end effectors 160 being coupled to the distal end 144 of the robotic arm 140, in further embodiments, the surface evaluation end effector 160E can be coupled to the distal end 144 of the robotic arm 140 at the same time another end effector 160 is coupled at distal end 144 of the robotic arm 140. For example, a mudding, sanding or painting end effector 160M, 160S, 160P can be coupled at distal end 144 of the robotic arm 140 at the same time as the surface evaluation end effector 160E such that mudding, sanding and/or painting tasks can be performed with the surface evaluation end effector 160E leading and/or trailing the mudding, sanding or painting end effector 160M, 160S, 160P such that the mudding, sanding and/or painting tasks can be evaluated by the surface evaluation end effector 160E at the same time such tasks are being performed.

Also, while some examples illustrate a surface evaluation end effector 160E being a separate end effector (e.g., separate from a mudding, sanding or painting end effector 160M, 160S, 160P as shown in FIG. 4), in further embodiments, the elements of a surface evaluation end effector 160E can be a portion of another end effector 160. For example, one or more of a mudding, sanding or painting end effector 160M, 160S, 160P can comprise any suitable elements of a surface evaluation end effector 160E. Such embodiments can be desirable to allow for tasks such as mudding, sanding and painting to be performed while finish evaluation occurs at the same time and without the need for a separate end effector to be coupled to the automated finishing system 100 before, during and/or after such mudding, sanding and painting tasks are performed.

In various embodiments, the robotic arm 140 may control the distance between the surface evaluation end effector 160E and a surface being evaluated, the angle of the surface evaluation end effector 160E relative to the surface, as well as the overlap between different measurements and/or images generated by the surface evaluation end effector 160E. The robotic arm 140 may be used to take multiple measurements across a surface by scanning the surface to establish a surface quality measurement and to identify features, imperfections, and areas that may require rework. The robotic arm 140 may be used to position the surface evaluation end effector 160E at different angles and distances from the same target area collecting images and measurements at each of these positions. Sensors and lights may be mounted on additional stages, individually or as a group, to allow for the angle of the sensors and lights relative to each other to be changed and controlled.

The entire surface evaluation end effector 160E or parts of the surface evaluation end effector 160E may be mounted on a compliant stage that is mounted at the end of the robotic arm 140. The compliant stage may be used to bring the surface evaluation end effector 160E in direct contact with the target surface or other reference surfaces without damaging the surfaces. The compliant stage can be instrumented to capture when contact is made with the target surface and how much the stage moved or deflected during contact. This information may be used to establish the planarity of the surfaces or to provide information of the system of the surface relative to the base of the robotic arm 140 and mobile base. The robotic arm 140 may use force control to position the system with or without a compliant stage. The force control may be used to ensure forces are not exceeded during positioning to protect the target surface, adjacent surfaces, workers, and the system itself.

Compliant stages can include pneumatic systems whose compliance may be passively or actively controlled. Such compliance may also be achieved using a hydraulic system or electromechanical stage which utilize sensor readings to actively control the position of the stage to maintain contact forces within allowable limits. Compliant stages may be instrumented with contact sensors including pressure sensors, force sensors, conductivity sensors, and the like, on the contact points. The compliant stage may also be instrumented with sensors that measure the distance between the stage and its base. As the stage is compressed or extended, the distance between the two parts changes. The distance between base and stage may be measured using encoders (e.g., optical, magnetic, incremental, absolute, quadrature), potentiometers, limit switches, hall effect sensors, flow sensors for hydraulic, pneumatic stages, and the like. The compliant stage may include displacement limits to prevent the stage from over-extending or over-compressing.

Although the example automated surface finishing system 100 of FIG. 4 is illustrated having six modular end effectors 160, other embodiments can include any suitable plurality of modular end effectors 160, with such end effectors 160 having any suitable configuration, and being for any suitable task or purpose. In further examples, the automated surface finishing system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for coating work, sanding, painting and evaluation of the same. Accordingly, the example of FIG. 4 should not be construed to be limiting on the wide variety of other embodiments that are within the scope and spirit of the present disclosure.

Figure 5:
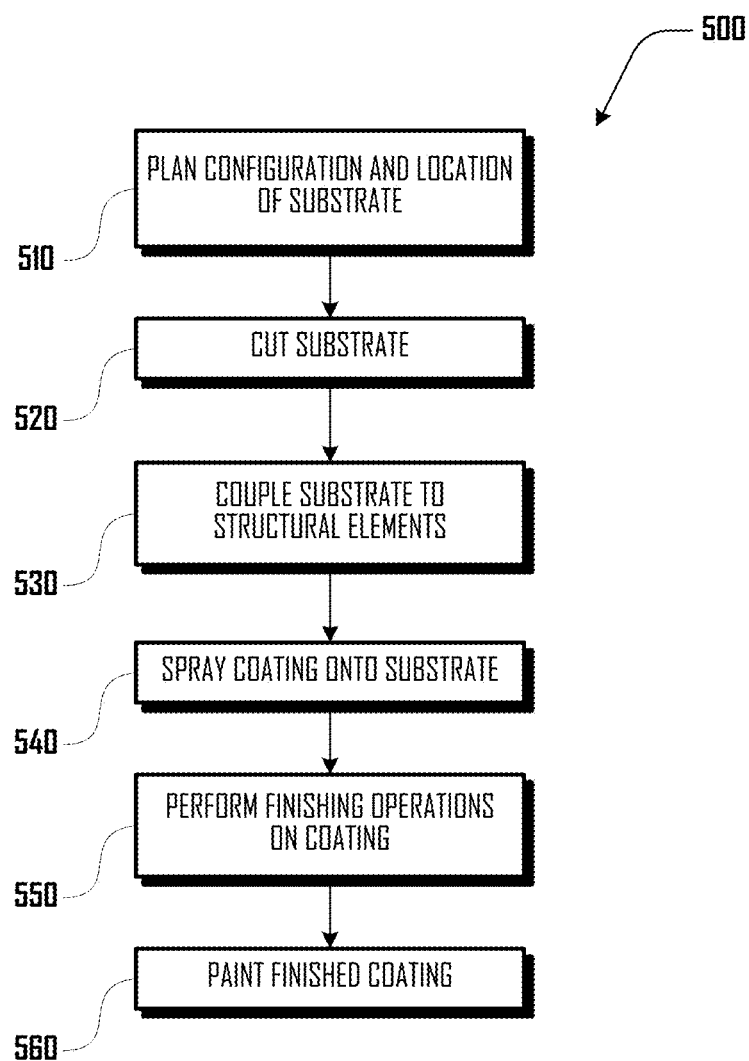
FIG. 5 illustrates a block diagram of method of installing surfaces in accordance with one embodiment.

Turning to FIG. 5, a method 500 of drywalling is illustrated, which can be performed in whole or in part by an automated surface finishing system 100 as discussed herein. The example method 500 or portions thereof can be performed automatically by the automated surface finishing system 100 with or without user interaction.

The method 500 begins at 510, where a configuration and location of substrate pieces is planned. As discussed herein, in various examples a substrate can comprise one or more of mesh, paper, cloth surface, lath, buttonboard, rock lath, rainscreen, a porous surface, drywall board, and the like. For example, in some embodiments, the automated surface finishing system 100 can be configured for automated scanning and mapping of a worksite (e.g., framing elements of a house or building) and automated planning of the shapes and sizes of substrate to be disposed at the worksite to generate walls, ceilings, and the like. Such scanning and mapping can include use of vision systems 324, 364 (FIG. 3) and the like. Planning of shapes and sizes of substrate can be based at least in part on the scanning and mapping and can be performed by a computing device 100 of the automated surface finishing system 100 or other suitable device which can be proximate or remote from the automated surface finishing system 100. In some embodiments, such planning can be based at least in part on building plans or maps that were not generated by the automated surface finishing system 100.

The method 500 continues to 520, where substrate pieces are cut. Such cutting can be based at least in part on the scanning, mapping and planning discussed above. Additionally, such cutting can be performed by the automated surface finishing system 100 at a worksite (e.g., via a cutting end effector 160C) or can be performed by a system remote from the worksite and generated substrate pieces can be delivered to the worksite.

At 530, generated pieces of substrate can be hung at the worksite, including hanging on studs, beams, posts, wall plates, lintels, joists, and the like, to define walls, ceilings and the like. Screws, nails or other suitable fasteners can be used to hang the substrate. In some embodiments, the automated surface finishing system 100 can be configured to hang substrate including positioning the substrate and coupling the substrate in a desired location. In some examples, the automated surface finishing system 100 can be configured to assist a user in hanging substrate, including holding the substrate and/or tools in place while the user fixes the substrate pieces in place. In various examples, a hanging end effector 160H can be used for such substrate hanging.

At 540, coating work can be performed on the hung substrate. For example, a coating such as plaster, stucco, parex, gypsum, or the like (known also as "mud") can be applied to seams or joints between adjacent pieces of substrate, over the substrate, and/or can be applied over fasteners such as screws or the like. In various examples, a coating end effector 160M can be used to perform such coating work.

At 550, sanding can be performed on the coatings. For example, where wet joint compound is applied to hung substrate, the joint compound can be allowed to dry and can then be sanded by a sanding end effector 160S of an automated surface finishing system 100. In various examples, sanding can be performed to smooth out joint compound to generate a planar or otherwise consistent profile on the pieces of substrate in preparation for painting. At 560, the sanded substrate pieces can be painted. For example, in various examples, a painting end effector 160P of an automated surface finishing system 100 can be used to paint the coating.

In some embodiments, after spraying the coating onto the substrate, the coating can be worked into the substrate using trowels, edges, and other suitable tools. This process can be done manually or using the automated system 100. The tools may be powered using electricity, compressed air, hydraulics or a combination of these. The tools may be instrumented with sensors to measure humidity, pressure, viscosity, roughness, force, and light reflectivity. After the coating has dried, it may be treated with manual or powered tools to create the desired finish, texture, and material properties. The tools may be used by workers or the automated system 100 can use the tools to affect the surface. The system 100 may use tools such as sanders, polishers, powered trowels, or the like. The tools or automated system(s) 100 may utilize vacuum systems to capture particles or fumes. The sensors on the tools may be used to control the force, pressure, speed with which the tools are used on the surface.

The system 100 may utilize sensors (e.g., that are part of a surface evaluation end effector 160E or other surface evaluation system) to capture and/or evaluate the finish or texture of the coating at different stages. For example, in some embodiments, a surface evaluation end effector can evaluate a surface after substrate is coupled to structural elements at 530; after coating is applied to the substrate at 540; after finishing operations are applied to the coating at 550; and/or after finished coating is painted at 560. Cameras, laser systems, texture analyzers, reflectivity sensor, conductivity measurements, and/or other contact or non-contact systems may be used to evaluate surfaces such as a plain surface defined by substrate applied to structural elements; a surface defined by coating (e.g., joint compound) that has been applied to a surface; a surface defined by the coating after the coating has been sanded or otherwise sculpted; and/or a surface defined by paint or other secondary coating applied over a primary coating on the surface.

Such evaluation data can be used as feedback for the tools and process. For example, a drywall surface of drywall applied to structural elements, including joints between drywall pieces, can be evaluated to determine if such a drywall surface meets a minimum threshold before further stages of work are performed on the drywall pieces (e.g., mud work, sanding, and painting). Similarly, a joint compound surface of joint compound applied to a base surface (e.g., drywall pieces) can be evaluated to determine if such a joint compound surface meets a minimum threshold before further stages of work are performed on the joint compound surface (e.g., sanding and painting).

Additionally, a treated joint compound surface of treated joint compound (e.g., sanded joint compound) can be evaluated to determine if such a treated joint compound surface meets a minimum threshold before further stages of work are performed on the treated joint compound surface (e.g., painting). Also, a painted surface (e.g., paint applied to joint compound) can be evaluated to determine if such a painted surface meets a minimum threshold before further stages of work are performed or the painted surface is considered completed.

In various examples, an evaluation of a surface that indicates that the surface meets a minimum threshold can cause an automated finishing system to perform a subsequent step in generating a wall assembly, or the like. Alternatively, an evaluation of a surface that indicates that the surface does not a minimum threshold can cause an automated finishing system to not perform a subsequent step or stop operation; to re-perform a previous step; to perform a surface remediation step; to provide an alert to an operator, or the like.

For example, where a surface evaluation end effector 160E evaluates a sanded compound surface and determines that the sanded compound surface does not meet a minimum quality threshold, a finishing system 100 can re-perform a sanding task or perform a sanding correction or remediation task on the surface that has been determined to not meet the minimum quality threshold. Such tasks can be performed on an entire surface or a sub-set of the surface that has been identified to not meet the minimum quality threshold. Accordingly, in various embodiments, portions, sectors, or sections of a given surface can be determined as meeting or not meeting a minimum quality threshold.

Data regarding various aspects of a surface can be generated by an evaluation end effector 160E or other surface evaluation system, including roughness, sheen, reflectivity, planarity, texture, porosity, number and size of defects, and the like. Such surface aspect data can be used by a finishing system 100 to determine or modify how a given surface, or portion of a surface, is treated in subsequent finishing performed by the finishing system. For example, where an area of a surface having sanded joint compound is identified as having a roughness above a given threshold, that portion of the surface or the entire surface can have an extra coat of paint or primer applied, can have different paint nozzle parameters applied, can have a different flow of paint applied, can have additives applied to the paint, and the like. Accordingly, surface aspect data can be used to modify or determine how a surface and/or portions of the surface are treated by a finishing system 100.

The surface evaluation system 1000 may also be used to help position the automated finishing system 100 and/or end effectors 160 relative to a target surface. The surface evaluation system 1000 may identify patterns made by any of the following features of the wall finish, including texture, porosity, number and size of defects, roughness, sheen, reflectivity and the like. The automated finishing system 100 may use these patterns to locate a tool (e.g., a tool of an end effector 160) between adjacent steps (e.g., steps of a finishing process) enabling the automated finishing system 100 to determine and tune parameters of the automated finishing system 100 (e.g., of tool of an end effector 160, and the like) to target the identified surface finish pattern. This may enable the automated finishing system 100 to achieve a desired or required finish level in less time or with less work. For example, the automated finishing system 100 may do a very quick, light sanding pass on a surface when the surface evaluation via the surface evaluation system 1000 has identified that the defects or texture are very small, the automated finishing system 100 may then increase pressure, the revolutions per minute of the sanding head, use a lower grit sandpaper, or decrease the linear speed of the tool relative to the surface to target areas that have been identified as having greater texture or number and size of defects. The automated finishing system 100 may use the surface evaluation measurements made by a surface evaluation system 1000 before and after a finishing step to evaluate and tune the finishing parameters.

Coating applied to a surface can be combined with a paint, tint, pigment, or the like before and/or after application on a substrate or other surface. The coating can also be subsequently sprayed with a paint or sealant to create the finished surface after the coating is applied to a substrate or other surface. Tinted plaster, gypsum, or the like, can be sprayed to create a colored surface in a single coating. Other additives can also be mixed into the coating to control curing or drying time, surface finish, material properties, and the like. Material properties can include hardness, reflectivity, sound insulation, thermal insulation, fire rating, texture, finish, and the like. Accelerated curing or drying of the coating can be achieved through light or temperature activation that can be passive or active; via exposure to air as the coating is sprayed; via addition of a chemical accelerant, curing agent, or catalyst during mixing; during spraying or as an additional coating; or the like.

Chopped fibers and other particles can be added to the coating before, during or after application to a substrate to create a composite. The fibers can act to increase the strength of the coating and can create mechanical bonds to the substrate materials. The fibers can be added directly into the mixture that can be pumped to a nozzle or such fibers can be applied at a nozzle. The substrate can be covered in fibers or features that the coating can attach to.

Tools such as a curing light, heater, or blower can be mounted on the same tool as the sprayer to follow the delivery or can be mounted on another suitable portion of the system 100 or separately therefrom. Additionally, the robotic system 100 can be used after spraying to move such a heater, blower, light, or other suitable tool or device over the substrate or surface. The velocity of the base unit 120 can be controlled to set a given work time for each of the tools. The curing or drying time can also be controlled by mixing powdered material with a volatile solvent instead of water.

Although the method 500 of FIG. 5 relates to hanging and finishing surfaces, it should be clear that other hanging and finishing methods can similarly be employed by the automated surface finishing system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

In one aspect, the present disclosure pertains to systems and methods for automated mixing, delivering, applying, curing, and/or drying coatings onto a substrate. In one embodiment, an automated surface finishing system 100 can be used to mix, deliver, apply, and dry coatings on substrates. The automated surface finishing system 100 can be used to apply tape on seams between substrates, apply joint compound or plaster onto the tape and substrate, expedite the drying process, or any combination of these processes. The automated surface finishing system 100 can also be used to apply the joint tape and compound and achieve any level of drywall finish, including between level 0 and level 5, along with determining the level of drywall finish with a surface evaluation system. The automated surface finishing system 100 can utilize joint compound known as mud or setting type compound also known as hot mud. Joint compound as discussed herein can encompass pre-mixed, topping, taping, multi-use and all-purpose compounds. The automated surface finishing system 100 can also be used with other coatings including plaster, cement, stucco, and paint applied onto drywall, lath, mesh or another suitable substrate. The automated surface finishing system 100 can cover how the coating is prepared, how it is delivered onto the substrate and how it is set, cured or dried.

The automated surface finishing system 100 can include humidity, temperature, air flow sensors, or the like, to establish environmental conditions for a task. Such sensors can comprise sensors 326, 346, 366 of a base unit 120, robotic arm 140 and/or end effector 160 of the automated surface finishing system 100 (see, e.g., FIG. 3). An automated coating system can utilize these environmental sensors to determine optimal joint compound mixture ratios, set path parameters such as feed speed, thickness of coating applied, blade profiles and pressures, and sprayer settings. The environmental information in conjunction with the coating parameters can be used to determine or estimate drying and setting times for the coating allowing the automated surface finishing system 100 to plan when a next step should begin.

The automated surface finishing system 100 can also determine when the coating has set and dried by measuring the moisture content, thermal conductivity of the covered seam, using a thermal imaging camera or thermometer (contact or non-contact), detecting differences in colors using a camera, or the like. Thermal measurements can be used to infer the moisture content by comparing the temperature of the coating to the surrounding materials, and as the water evaporates from the mixture, the temperature of the compound can be lower than that of the surrounding materials.

Models of the coating drying process can also be used to estimate the time to dry or cure given a set of starting conditions and information about the environment. Similarly, the models of the coating in combination with environmental and substrate information can be used to estimate the drying shrinkage of the coating.

Environmental sensors can be used in conjunction with an HVAC system, heater, air conditioner, fans, or the like, to control the room conditions. The sensor readings can trigger any of these systems or a combination to maintain the room at the desired conditions for quality, reduced drying or setting time, or comfort of the operator. In some embodiments, such environmental control systems can be a part of the automated surface finishing system 100 or can be located external to the automated surface finishing system 100 including environmental control systems of a worksite. Accordingly, in various embodiments, the automated surface finishing system 100 can be configured to control environmental control systems that are a part of or external to the automated surface finishing system 100, including via wired and/or wireless communication.

A coating system can comprise of a variety of tools that enable the coating system to mix, deliver, apply, smooth, dry, cure a coating, evaluate a surface defined by the coating, or any combination of these. Such tools can be positioned and controlled using a robotic manipulator, robotic arm, positioning stage, gantry or any combination of these. A single end effector 160 or any multitude of end effectors 160 can be used to complete the task through coordinated or individual paths. The robotic arms 140 or tool stages can be moved around the room using a mobile base unit 120 that can be powered or moved manually by an operator. For example, in some embodiments a coating system of an automated surface finishing system 100 can include one or more coating end effector 160M, and elements associate with the base unit 120, including a coating source 430 (see FIG. 4).

The mobile base unit 120, one or more end effectors 160 and/or one or more robotic arms 140 can include sensors (e.g., sensors 326, 346, 366 as discussed in FIG. 3) to ensure safe operation next to the user. Safety sensors can include but are not limited to laser curtains, proximity sensors, force and torque sensors, pressure sensors, limit switches, or the like. Additionally, the automated surface finishing system 100 can include systems to track location of one or more user relative to end effector 160, robotic arm 140 and/or mobile base unit 120, including speed limiters and/or vision systems, such as LIDAR, radar, sonar, or any combination of these (for example, vision systems 324, 364 of FIG. 3).

As discussed herein, the mobile base 120 can include a vertical lift 126 that can be powered or unpowered. The vertical lift 126 can be used to lift or lower the robotic arm 140, end effector 160 and portions of a coating system, which can be disposed on the end effector 160, platform 122, a gantry or the like. The lift can be instrumented with a position sensor that can be used to capture and control the height of the lift 126. For example such a sensor can comprise the sensors 326 as illustrated in FIG. 3.

Elements of coating system of the automated surface finishing system 100 can be controlled using the control system 322 that takes a variety of inputs (e.g., from a surface evaluation system, sensors 326, 346, 366 and/or vision systems 324, 364) to determine tool paths and/or tool parameters for the platform 122 relative to the cart 124, robotic arm 140, and coating devices 468 and or coating applicator 466 of a coating end effector 160M, which are required to achieve desired coating characteristics.

In various embodiments, the automated surface finishing system 100 can create a map of the target surfaces such as pieces of substrate, joints between pieces of substrate, and the like. This map or model can be created by importing building information modeling (BIM) and/or 2D, 3D plans into a planner system. The map can be created directly by the system by utilizing computer vision or mapping sensors to scan the room (e.g., of the automated surface finishing system 100). The scanning technologies can include, and suitable devices including stereo cameras, structured light cameras, LIDAR, radar, sonar, laser scanners, thermal imaging or any combination of these components. For example, in some embodiments, such scanning or vision systems can comprise the vision systems 324, 364

Uploaded 3D or 2D plans can be combined with field data (e.g., surface condition data) to create a more accurate map of the environment in some examples. The data from different sources can be combined using key features and user input. The map can include the location of framing studs, substrate joints, openings, protrusions, as well as pipes, electrical conduit, ventilation ducts, and any other components installed on the walls or ceilings. These locations may have been derived from the uploaded plans, the room scan, user inputs, and the like. To facilitate the creation of the map, a user can help identify features through analysis of images, tagging of the features physically or digitally. The user can physically tag components using various suitable methods, including but not limited to, a laser, tags, markers or a combination of these. The scanning or vision system can pick up these tags or track them as the user moves around the room and locates the features. The mapping system or planner can also take as an input a layout of how the substrate pieces were hung in the room to locate seams. This layout can be an input from the automated surface finishing system 100 or a system that is separate from the automated surface finishing system. The location of framing, type of anchors used and layout of the substrate can provide information on the planarity, flatness of the wall, and location of high or low points, which can be used determine tool paths and tool parameters.

The automated surface finishing system 100 can include a computational planner (e.g., implemented by the control system 322 of the base unit 100) which can utilize a map uploaded to the system 100 or created by the system 100 to determine tool paths and/or tool parameters to achieve a desired coating application. The planner can create toolpaths off a global map of a room and then update these paths given updated local measurements once the end effector 160, robotic arm 140, and/or mobile base 120 are in place. The planner can be informed by vision system data (e.g. obtained by one or both of vision systems 324, 364 and/or a surface evaluation system) on the flatness of the wall, user inputs, location of seams as specified by a layout planner or a scan of the room after the substrate was applied. The planner can determine toolpaths and/or tool parameters to enable the automated surface finishing system 100 to apply coating to smooth out joints, seams, low points, high points, and other features to create a visually flat wall.

For example, tool paths can include information corresponding to, or used to determine, instructions for one or more of movement systems 328, 348, 368 to drive the base unit 120, robotic arm 140 and/or end effector 160 to move to perform desired tasks, including applying coating, applying joint tape, performing a surface evaluation, and the like. Tool parameters can include various setting for components of the end effector 160 (e.g., settings for the coating applicator 466; coating devices 468 of a coating end effector 160M; evaluation devices 180 of a surface evaluation end effector 160E), including a nozzle selection, a nozzle size setting, coating flow rate, and the like as discussed in more detail herein.

The toolpaths and/or tool parameters can also be determined based on a desired or required finish for completed coating work or for a completed wall assembly and/or based on surface condition data generated by a surface evaluation system, or the like. For example, areas of a wall or ceiling that are exposed to changing, harsh, or bright lights can receive a higher quality finish with tighter controls on tool planarity, tool overlaps, thickness and characteristics of compound applied, texture. The quality of such a finish can be evaluated by a surface evaluation system, or the like.

The application of coating to a surface can inform how the surface is to be sanded, smoothed or polished to achieve a desired finish. For example, surface condition data generated by a surface evaluation system along with toolpaths and/or tool parameters generated during coating work can serve as inputs for generating toolpaths and/or tool parameters for sanding, which in some examples can enable sanding to be tuned according to the application of the compound, features, and compound characteristics such as how the compound was dried, compound type, compound hardness, and layers of compound applied.

For example, the automated surface finishing system 100 can determine toolpaths and/or tool parameters for performing mud work with a coating end effector 160M, and these determined toolpaths, tool parameters, and/or data associated thereto can be used to determine toolpaths and/or tool parameters for one or more sanding tasks to be performed by the automated surface finishing system 100 using a sanding end effector 160S.

Similarly, determining toolpaths and/or tool parameters for performing coating work with a coating end effector 160M can be based on various suitable inputs, including toolpaths, tool parameters, and/or the like associated with hanging substrate or applying insulation to a wall assembly on which the substrate is hung. For example, the automated surface finishing system 100 can determine toolpaths and/or tool parameters for performing substrate hanging with a hanging end effector 160H, and these determined toolpaths, tool parameters, and/or data associated thereto can be used to determine toolpaths and/or tool parameters for one or more coating tasks to be performed by the automated surface finishing system 100 using a coating end effector 160M.

During coating work, automated surface finishing system 100 can apply a layer or profile of compound that is greater than a thickness that can be conventionally manually applied by human workers to allow for a sanding system (e.g., a sanding end effector 160S) to sand down the compound to a desired plane. For example, in some examples, manual joint compound application mud can be profiled to taper from high points. The automated surface finishing system 100 can apply a thicker layer than normal enabling a sanding system to sand down high points to be level to the adjacent surfaces.

For example, related applications that are incorporated herein illustrate one example of a mud application profile for a pair of drywall pieces that form a seam, where joint compound is applied over consecutive layers, which can include joint tape, to taper out the high points of joint compound over a wider area. Sanding can then be used to smooth out the final profile, which in some examples can be determined by a surface evaluation system. The high points of joint compound can be caused by various features, including the seam, feature, raised stud, defect, or any combination of these, which in some examples can be identified by a surface evaluation system. In some embodiments, such a mud application can be undesirable for automated application; however, in further embodiments, such a mud application profile can be employed by an automated system such as the automated surface finishing system 100.

Figure 6A:
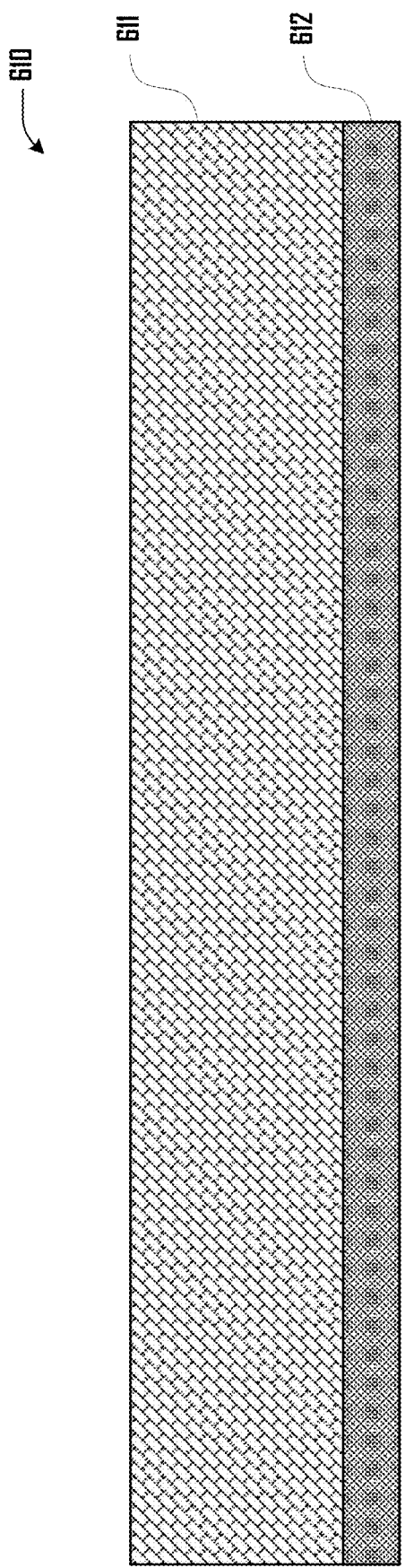
FIGS. 6a and 6b illustrate example embodiments of a substrate in accordance with various embodiments.

As discussed herein, various types of substrates can be used to generate a wall assembly including a substrate that comprises mesh, paper, plastic, cloth surface, lath, buttonboard, rock lath, rainscreen, drywall board, a porous surface, or the like. For example, FIG. 6a illustrates an example of a two-layer substrate 610 that comprises a porous layer 611 and a less-porous layer 612. The porous layer 611 can have pores where the coating material can enter and adhere, while the less-porous layer 612, which can be attached to a wall or studs, can be non-porous and impermeable to the coating material such that the coating material does not impregnate or permeate through the less-porous layer 612. For example, the less-porous layer 612 can stop the coating material from reaching the opposing side of the substrate. In further embodiments, the less-porous layer 612 can be porous such the coating material is able to soak through, impregnate, or permeate at least a portion of the less-porous layer 612.

Such a configuration of a multi-layer substrate 610 comprising a porous layer 611 and a less-porous layer 612 can be desirable for allowing a fluid coating material to be applied to the substrate 610 as described herein, and when the fluid coating material dries to become rigid or non-fluidic, the porous layer 611 can provide a support matrix for dried coating material to improve the strength of the dried coating material and/or to assist with coupling the dried coating material to the less-porous layer 612 and thereby to the wall or studs that the less-porous layer 612 is coupled to.

Such a multi-layer substrate 610 comprising a porous layer 611 and a less-porous layer 612 can have various suitable configurations. For example, the porous layer 611 and a less-porous layer 612 can be physically separate layers that are coupled via an adhesive, weld, or the like. In other examples, a portion of the porous layer 611 can be embedded in a portion of the porous layer 611 or the porous layer 611 can be an integral part of and can extend from the less-porous layer 612.

Also, one or both of the porous layer 611 and less-porous layer 612 can be rigid or flexible. For example, the less-porous layer 612 can comprise a rigid drywall board or piece of wood and the porous layer 611 can comprise a flexible cloth or batting. In further examples, both the porous layer 611 and less-porous layer 612 can be flexible (e.g., the less-porous layer 612 can comprise an impermeable or semi-permeable paper or plastic and the porous layer 611 can comprise a flexible permeable matrix or mesh of a suitable material. Having both the porous layer 611 and less-porous layer 612 being flexible can be desirable because such a configuration can allow the substrate 610 to be stored in rolls and applied to studs or a wall via the roll, which may or may not include cutting of the substrate 610.

Although various examples include application of the substrate 610 to a wall or studs with the porous layer 611 and less-porous layer 612 being coupled together, in further embodiments, the porous layer 611 and less-porous layer 612 can be applied separately. For example, the less-porous layer 612 can be first applied, and then the porous layer 611 can be applied to the less-porous layer 612.

Various embodiments can include selecting, configuration or changing properties of the substrate 610 to address different surfaces such as walls or ceilings or to control the target finish. The porosity, absorption properties, mesh size, wettability, adhesion properties, anchor spacing, substrate thickness and material composition may be controlled in the substrate to achieve the desired finish or address vertical vs horizontal surfaces, and in some examples a finish associated with the substrate 610 can be determined by a surface evaluation system. A backing material (e.g., the less-porous layer 612) may be used behind a mesh or porous surface (e.g., the porous layer 611) to set the thickness of the coating. The material thickness of the substrate 610 and/or spacing between substrate 610 and structural surfaces such as studs may also be used to control the thickness of the coating. The substrate 610 can comprise two or more different materials or mesh sizes as a way to control the thickness of the surface. For example, the substrate 610 can comprise any suitable plurality of different layers including two, three, four, five, six, or the like.

In some embodiments, the substrate 610 can be instrumented with one or more sensors that can measure humidity, temperature, conductivity, sound, or the like, which can be used to provide feedback during the spraying process; to serve as in wall-sensors for detection of leaks in the walls, temperature and humidity of the room, or environmental problems; or for other suitable purposes. For example one or both the porous layer 611 and less-porous layer 612 can comprise any suitable type of sensor. In some examples, such sensors can each wirelessly communicate with the system 100. In other examples, such sensors can be operably coupled (e.g., wirelessly or via a wire) to a wall assembly device, home automation system, or other suitable system and the surface finishing system 100 can communicate wirelessly with such a system or device.

Figure 6B:

Also, while the example of FIG. 6a illustrates a substrate 610 having a plurality of layers, further examples can include a substrate having a single layer as shown in FIG. 6b, which illustrates a substrate 610 consisting essentially of a less-permeable layer 612. However, in further embodiments, a substrate can consist essentially of the porous layer 611 or less-porous layer 612.

FIGS. 7a and 7b illustrate an example joint compound application process where the coating 630 is applied in a thick layer using a sprayer that generates a mud spray 700. Such an application process can be performed by the automated drywalling system 100 in various embodiments. The thickness of the coating 630 being applied to the pieces of substrate 610A, 610B defining a seam 620 can allow for a sanding system to be used to sand back high points of coating 630 to a level surface. The high points of coating 630 can be caused by the seam 620, feature, raised stud, defect, or any combination of these, and in some examples, such high points can be identified by a surface evaluation system.

The substrate 610 and sprayed coating 630 can be used as a stand-alone wall coating system for single-coat applications or as part of a multi-coat wall coating system. A multi-coat wall coating system can comprise two or more layers of the same or different materials applied manually and/or with automation. This can allow for an automated application of a coating 630 to the substrate 610 with desirable structural properties to be followed by an application of a coating 630 with desirable aesthetic finish properties, which in some examples can be identified by a surface evaluation system.

In some embodiments, a substrate 610 can have coating 630 applied as shown in FIGS. 7a, 7b or via other suitable methods as discussed herein and/or the substrate 630 can be pre-impregnated with a coating material 630 prior to hanging or it may be impregnated by one coating followed by a second material. The substrate 630 can be impregnated with a material similar to pre-preg composites. The coating material 630 in the substrate 610 can be activated or wetted by spraying a liquid material over it the coating material 630 to convert the impregnated material into a rigid coating. The coating 630 may be electrostatically charged and the substrate 610 grounded to accelerate coating particles towards the substrate 630 and improve adhesion and/or reduce overspray of the coating 630. The coating 630 can contain additives to facilitate electrostatic charging.

The 2D or 3D maps created by the automated surface finishing system 100 can be registered to the physical environment utilizing recognizable features such as doors, windows, outlets, corners, or the like. Such registration can also be done using markers, tags, laser outlines that are placed in the room, or the like. A projection and/or visualization system of the automated surface finishing system 100 can find the features or markers and can locate the maps created using these found features or markers. The automated surface finishing system 100 can utilize a user interface to enable the user to help locate the map or projection relative to the environment and resolve any issues or discrepancies. A user can utilize a physical marker to signify key features for the automated surface finishing system 100 allowing the automated surface finishing system 100 to locate the plan relative to the environment. The automated surface finishing system 100 can also use a robotic manipulator or end effector 160 to find target features, markers or surfaces and locate them relative to its own base unit 120 which can be located using a localization system including, but not limited to laser range finders, computer vision, LIDAR, radar, sonar, stereo vision, odometry, IMUs, or any combination of these.

The robotic arm 140 can utilize a compliant or force limiting end effector 160 to enable safe contact with the environment allowing the automated surface finishing system 100 to accurately locate target surfaces, features or components, accommodate errors in positioning without damaging the substrate or the end effector 160. By utilizing the robotic arm 140 and compliant end effector 160 to locate a physical component, the system 100 can establish a point, line, or plane and therefore locate the virtual plan on the environment. Toolpaths can be updated from the virtual plane to the physical plane. Refitting of the toolpaths onto the contacted surfaces can enable the system 100 to deal with errors and discrepancies between the modeled and physical environment. Such tools, features or elements of the system 100 can enable quick on-site calibration using global room wide maps and local measurements. Refitting the toolpaths can allow for errors in positioning of end effector 160, mobile base 120 or robotic arm 140. The system 100, including an end effector 160 can utilize radar, sonar, thermal imaging to establish what is behind the substrate (e.g., drywall), this information can be used to update a virtual map and ensure that no damage is done to any electrical, plumbing or ventilation while working on or about the substrate.

The planner can output tool poses or tool paths for the automated surface finishing system 100 (e.g., for an end effector 160, robotic arm 140, base unit 120) including, but not limited to joint commands, target poses and end effector positions, or any combination of these. The system 100 can also output paths for a gantry system or positioning stage which can be used in conjunction with the robotic arm 140 and/or end effector 160 or without a robot to move and position coating tools (e.g., coating devices 466 and/or coating applicators 468 of a coating end effector 160M). The planner can also output paths for the mobile base 120 to position a gantry, positioning stage, robotic arm 140, end effector 160, or to move a tool to assist a user in the finishing process, or to position visualization and lighting equipment, which may or may not be a part of the automated surface finishing system 100. The mobile base 120 and vertical lift 126 may work in coordination with a user, robotic arm 140, end effector 160 or a combination of these to execute the task. The planner system can control different components of the automated surface finishing system 100 (e.g., the base unit 120, robotic arm 140 and/or end effector 160) allowing for coordinated movements and forces with the target goal of moving the end effector 160 or portions thereof to a desired position under the prescribed forces and moments. The mobile base unit 120 can be used as a rough positioning stage, with the vertical lift 126 setting the height of the robotic arm 140 and end effector 160 which may act as a fine positioning stage.

Figure 8A:
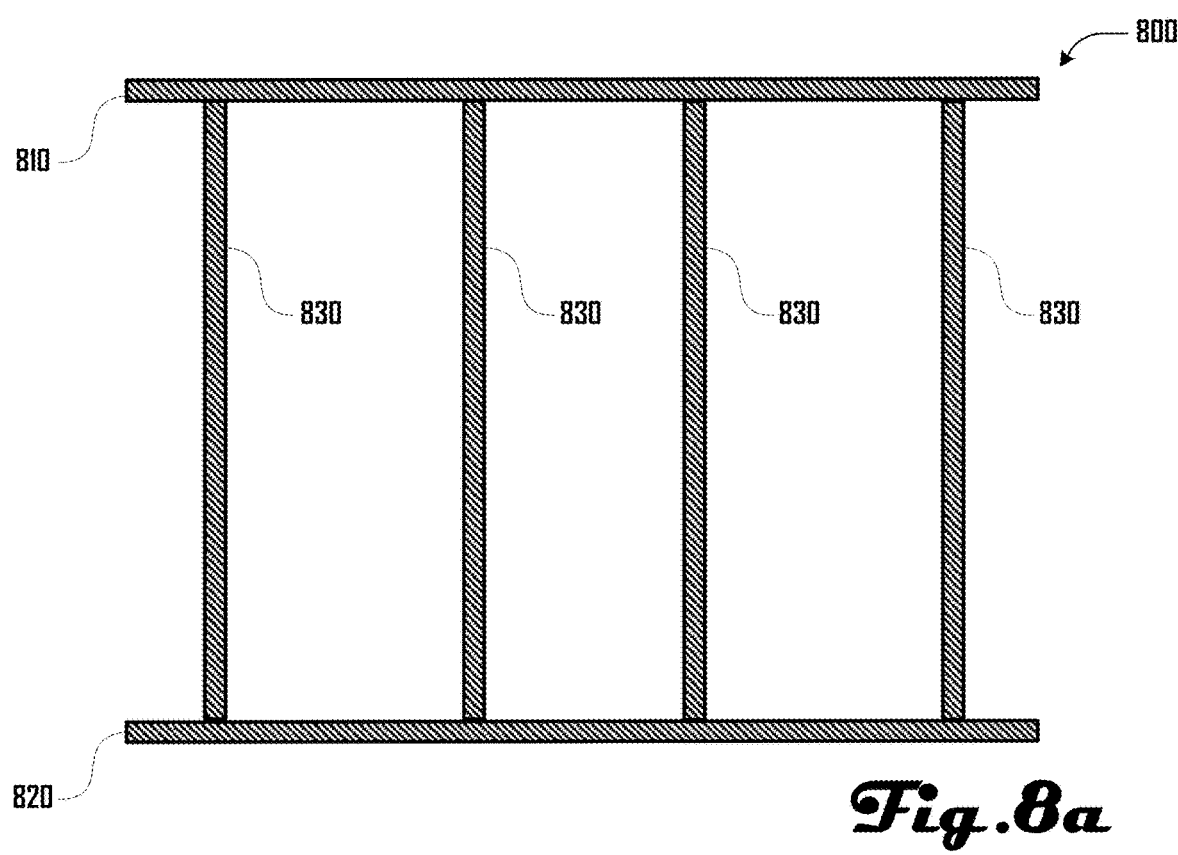
FIGS. 8a, 8b and 9a and 9b illustrate a series of steps in an example method of installing a substrate to generate a wall assembly.
Figure 8B:
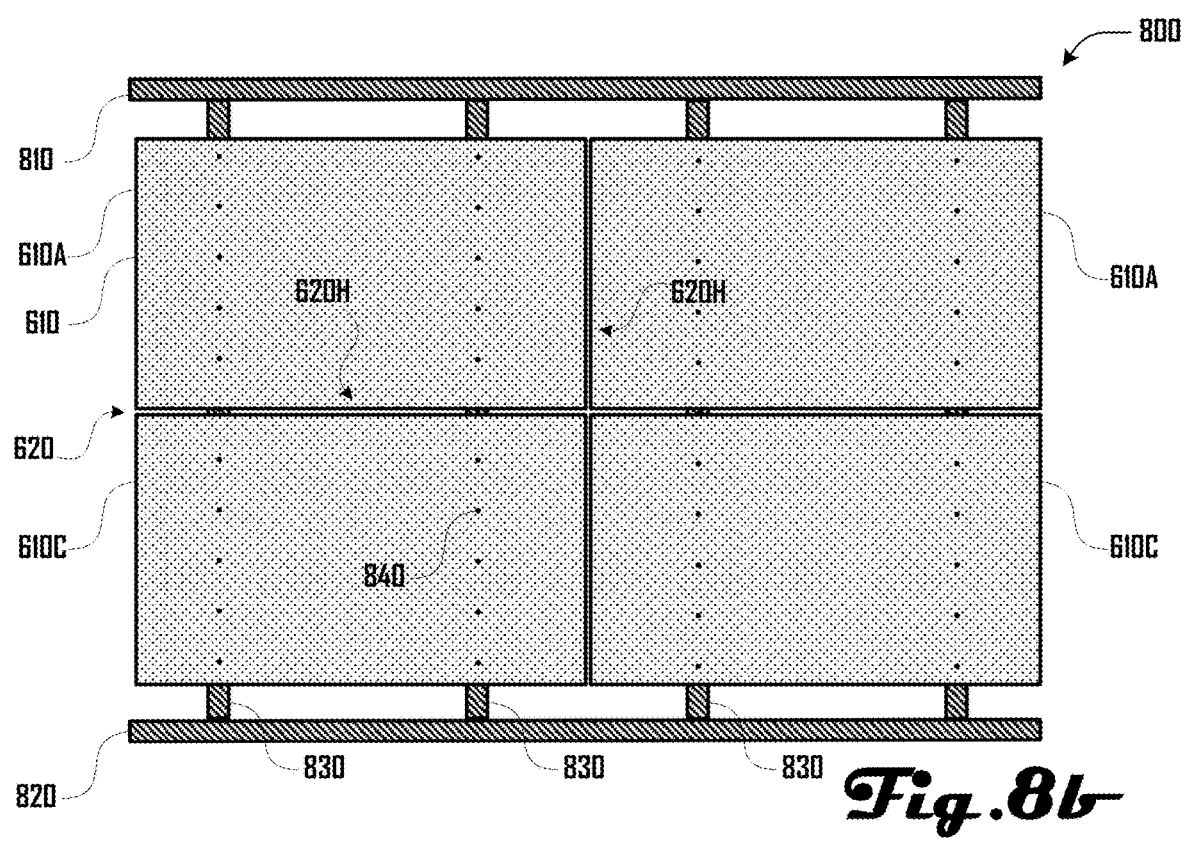
Figure 9A:
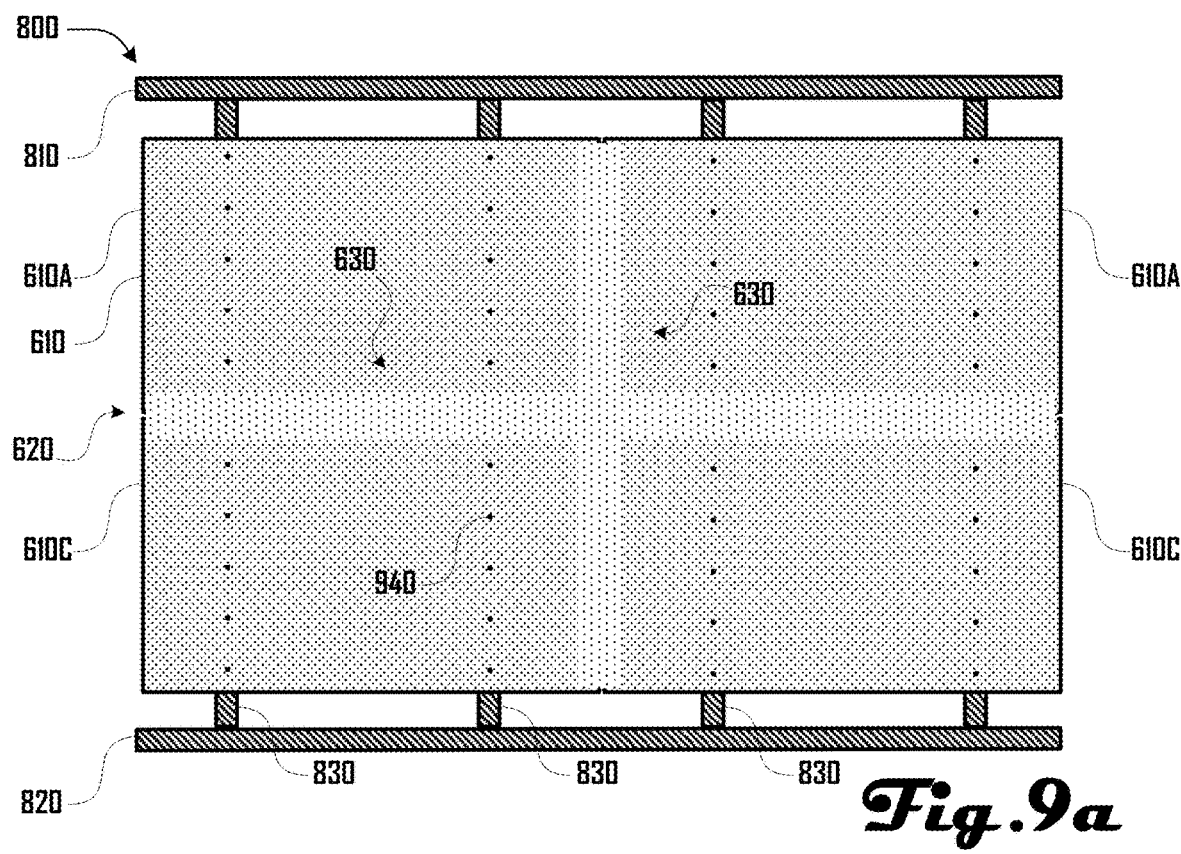
Figure 9B:
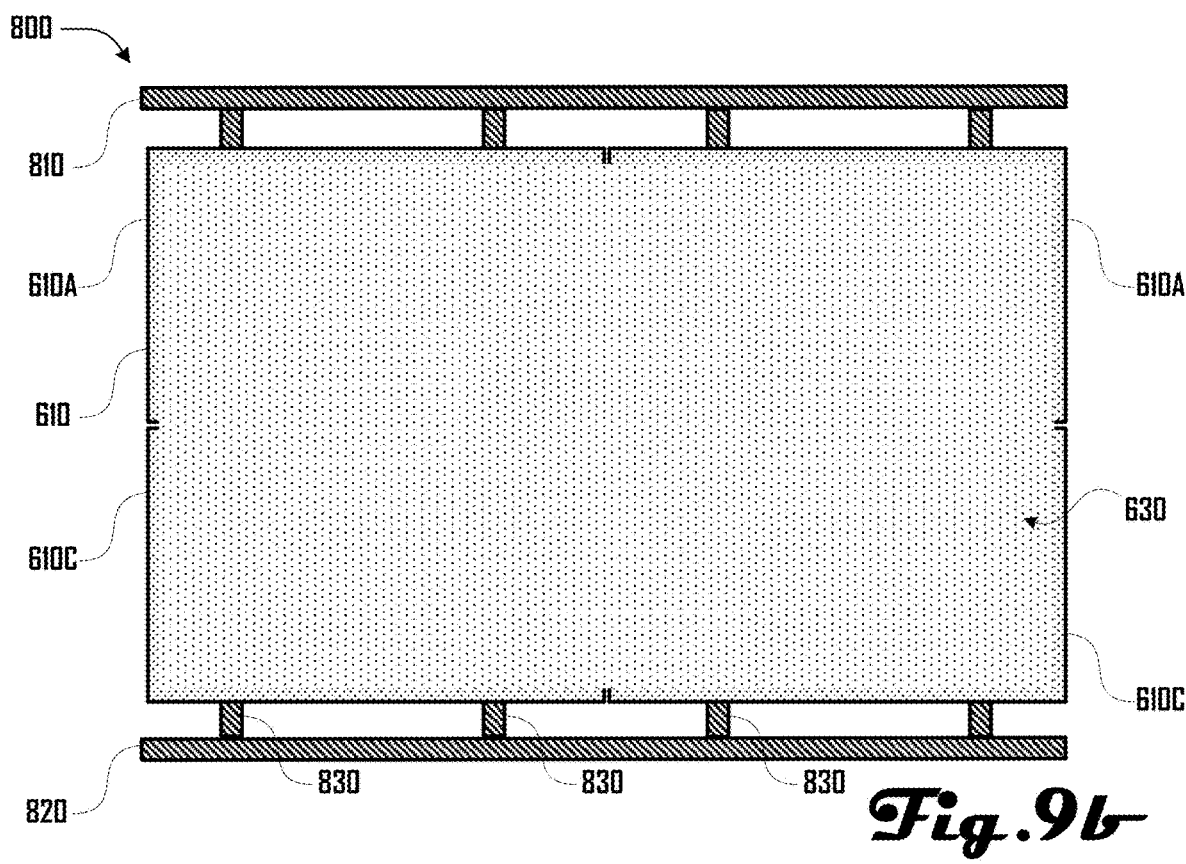

Turning to FIGS. 8a, 8b, 9a and 9b, examples of a wall assembly 800 including a plurality of substrate pieces 610A, 610B, 610C, 610D is illustrated. The wall assembly 800 can comprise a header 810 and footer 820, with a plurality of studs 830 extending therebetween as shown in FIG. 8a. As shown in FIG. 8b, the substrate 610 can be coupled to the studs 830 via a plurality of fasteners (e.g., drywall screws) that extend though the substrate 610 and into the studs 830. The substrate 610 can define one or more seams 620, including in the example of FIG. 8b a vertical seam 620V and a horizontal seam 620H. In some embodiments, coating work can be performed on the seams 620 as shown in FIG. 9a and leaving portions of the substrate 610 without coating 630. Additionally or alternatively, coating can be applied to portions of the substrate 610 in addition to about the seams 620 as shown in FIG. 9b.

FIG. 10 illustrates an example embodiment of a surface evaluation system 1000 disposed on a test surface 1001. The surface evaluation system 1000 includes a frame 1010 that comprises a plurality of base-bars 1011 coupled in a rectangular arrangement that defines a frame base 1012. A plurality of side-bars 1013 extend from corners of the frame base 1012 to define frame sidewalls 1014 and couple with top-bars 1015 that define a frame top 1016. The example frame 1010 is shown having a trapezoidal or cuboid shape in FIG. 10; however, further embodiments can have various suitable shapes and be configured in various suitable ways.

Shields and/or shades may be attached to in order to create a light box for controlling the lighting of the test surface 1001 (such shields and/or shades are not shown in FIG. 10 for purposes of clarity). For example, planar shields and/or shades can be coupled to the frame sidewalls 1014 or frame top 1016. The frame and shades may be collapsible to facilitate storage and transport of the surface evaluation system 1000.

The surface evaluation system 1000 can include one or more lights 1020 in the same or different orientations to light up the test surface 1001. For example, as shown in the example of FIG. 10, the surface evaluation system 1000 can comprise a first light 1020A coupled at the frame top 1016 that extends between a pair of opposing parallel top-bars 1015. The first light 1020A can be configured to illuminate the test surface 1001 at the frame base 1012. A second light 1020B can be coupled at the frame sidewalls 1014 extending between a top-bar 1015 and base-bar 1011 of the frame 1010. The second light 1020B can be configured to illuminate the test surface 1001 at the frame base 1012. The first and second light 1020A, 1020B can be disposed within a common plane.

In various embodiments, the wavelength(s) and/or intensity of light generated by the lights 1020 can be controlled. For example, the lights can be selectively dimmed/brightened and the color of the light can be changed including within non-visible wavelengths in some embodiments. Lights 1020 can comprise an array of lights in some embodiments that are collectively controlled as a light 1020. For example, selectively illuminating some bulbs of a light array can control the intensity of the light array and/or wavelength(s) generated by the light array. While FIG. 10 shows an example having two elongated lights 1020, further examples can have any suitable number of lights 1020 of various suitable types in various suitable locations.

Additionally, in various embodiments, the distance and angle relative of the lights 1020 to the test surface 1001 can be controlled. For example, the lights 1020 can be rotatably coupled to the frame 1010 (e.g., configured to rotate about a main axis of the lights 1020). In some examples, the lights 1020 can be configured to move (e.g., on rails of the frame, or the like), which can allow the distance and/or angle from the test surface 1001 to be selectively changed. The lights 1020 can be configured to translate about the frame 1010 to change the distance to the test surface 1001 while maintaining an orientation about a central axis of the light 1020. For example, a central axis of the first light 1020A can be disposed parallel to the test surface 1001 and can be configured to move about the frame 1010 parallel to, closer to, or farther from the test surface 1001 while the central axis of the first light 1020A remains parallel to the test surface 1001.

The surface evaluation system 1000 can further comprise one or more distance sensors 1030 and/or one or more contact sensors 1040 to position relative to the test surface 1001. For example, data obtained from such distance sensors 1030 and/or contact sensors 1040 can be used by an automated surface finishing system 100 to position and perform tasks with the surface evaluation system 1000 (e.g., as a surface evaluation end effector 160E). Distance sensors 1030 and contact sensors 1040 can be positioned proximate to corners of the frame 1010 at the frame base 1012 as shown in the example of FIG. 10; however, in further examples, distance sensors 1030 and contact sensors 1040 can be located in any suitable location and present in any suitable number. In some embodiments, one or more distance actuator 1070 can be disposed at the frame base 1012, which can engage the test surface 1001 and control the distance between the test surface 1001 and the surface evaluation system 1000

The surface evaluation system 1000 can include one or more cameras 1050 to capture images of the target surface 1001 and one or more scanners 1060, which can be used to capture three-dimensional topography of the target surface 1001, or the like. The camera 1050 and scanner 1060 can be configured to move. For example, as illustrated in FIG. 10, the camera 1050 and scanner 1060 can be movably disposed on rails coupled to the frame 1010. However, in further examples, a camera 1050 and scanner 1060 can be movable in any suitable way or can be static. Actuators may be used to control the distance and angles of the camera 1050 and scanner 1060 relative to the test surface 1001.

In some embodiments the surface evaluation system 1000 can be part of surface evaluation end effector 160E that can be coupled to a robotic finishing system 100, or the like. However, in further embodiments, a surface evaluation system 1000 can be disposed on a suitable positioning stage, a mobile base, a drone, a stand, or be handheld. For example, as shown in FIG. 10, the surface evaluation system 1000 can comprise one or more handles 1080, which can be used by an operator of the surface evaluation system 1000 to hold the surface evaluation system 1000 up to a target surface. Additionally, handles can be used by an operator to hold and position the surface evaluation systems while mounting the surface evaluation system 1000 on a stand, to a robotic finishing system 100, or the like. Such mounting can be via various suitable mounting features.

Figure 11A:
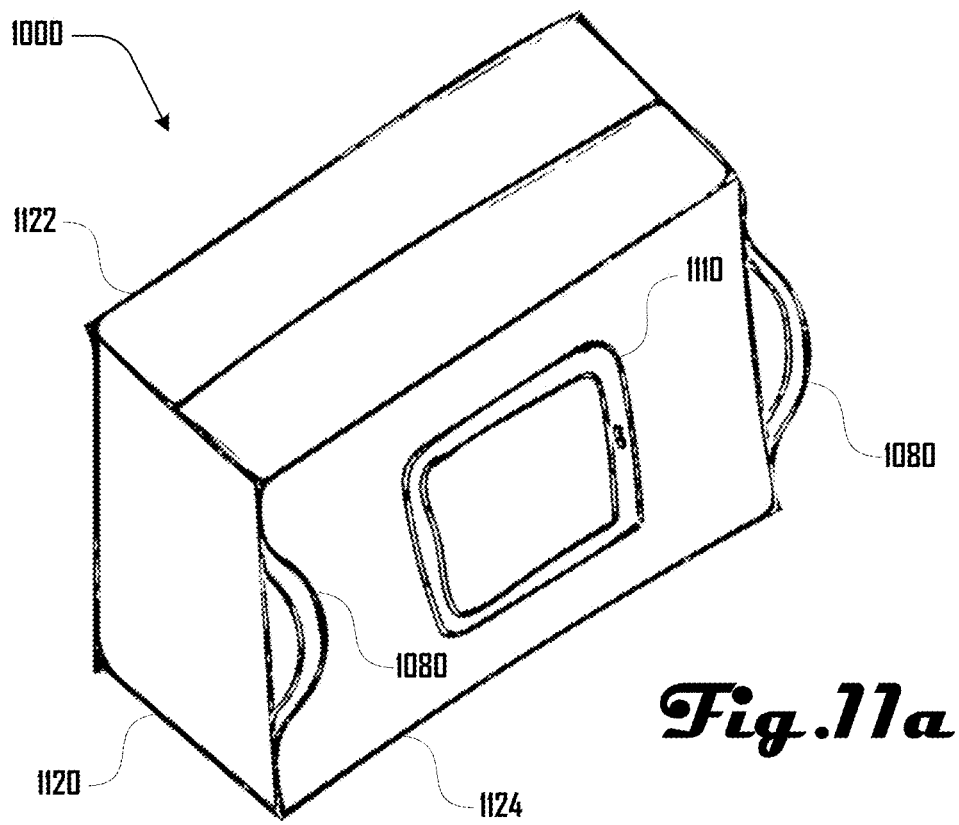
FIG. 11a illustrates a rear perspective view of an embodiment of a surface evaluation system having a display comprising tablet that is disposed on a light box.

As shown in FIG. 11a, in some embodiments, a surface evaluation system 1000 can comprise a display device 1110 that is configured to present various data or images to a user (e.g., the results of an image analysis). The operator may receive feedback on quality of the test surface 1001, areas of the test surface 1001 that need to be re-finished, instructions on how to change finishing parameters to improve surface finish, and the like. The surface evaluation system 1000 may continuously take images or video while a finishing task is being performed and can alert the operator when the desired or specified finish is achieved. Similarly, the surface evaluation system 1000 may continuously provide feedback to the robotic finishing system 100.

Figure 11B:
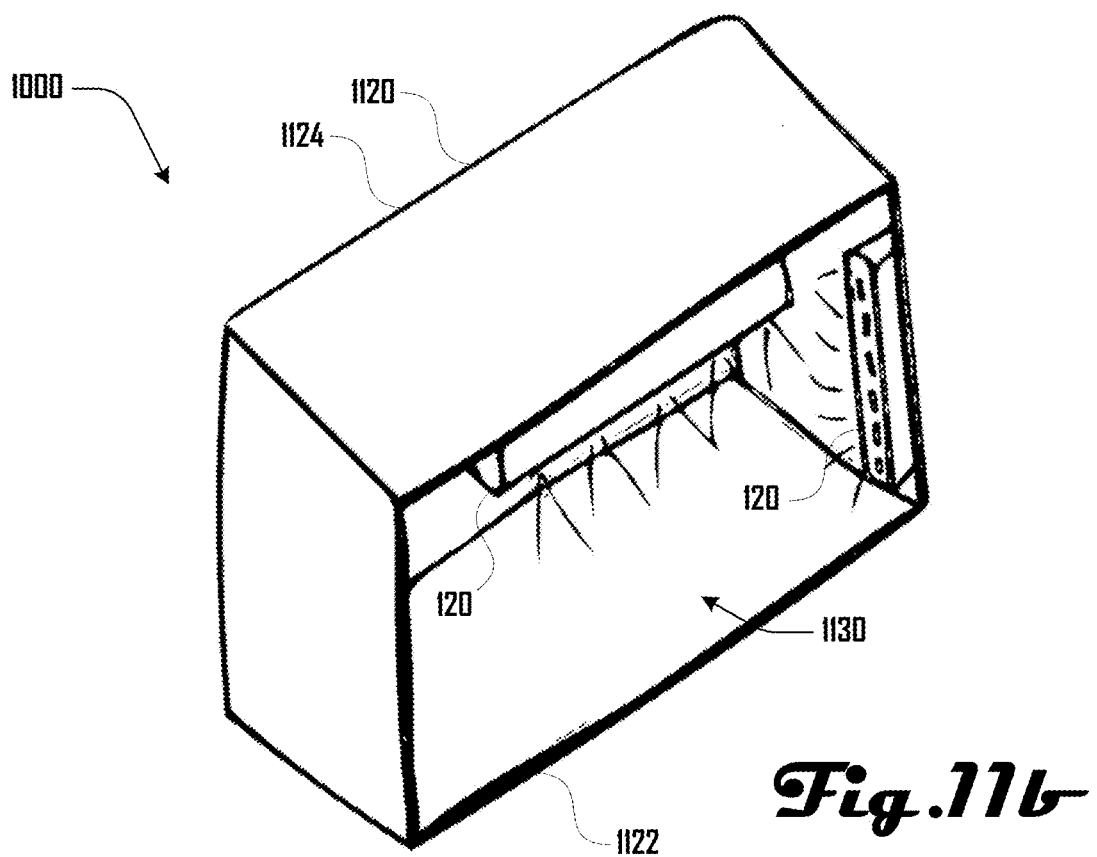
FIG. 11b illustrates a front perspective view of the surface evaluation system of FIG. 11a that shows a light box cavity defined by the light box with a plurality of lights disposed within the light box cavity.

FIG. 11a is a rear perspective view of an embodiment of a surface evaluation system 1000 where the display device 1110 comprises tablet that is disposed on a light box 1120 having a base end 1122 and a rear end 1124. FIG. 11b illustrates a front perspective view of the surface evaluation system 1000 of FIG. 11a and illustrates a light box cavity 1130 defined by the light box 1120 with a plurality of lights 1020 disposed within the light box cavity 1130.

In various embodiments, one or more lights 1020 can be mounted on the light box 1120 within the cavity 1130 in various suitable ways to shine light on the test surface 1001 in multiple orientations. In one embodiment, one light 1020 is mounted to shine light horizontally while a second light 1020 is mounted to shine light vertically. The one or more lights 1020 may be independently controlled (e.g., controlled for turning on and off, varying the intensity of the light(s) 1020, wavelength of the light(s) and the like. The surface evaluation system 1000 may be collapsed to facilitate transport and storage. In some embodiments, a handheld surface evaluation system 1000 may be created by mounting the one or more lights 1020 and display device 1110 on a collapsible storage box or light box 1120. Accordingly, in various embodiments, the light box 1120 can collapsible in any suitable way, including by comprising a plurality of foldable, rigid panels; by comprising a plurality of sheets (e.g., fabric); or the like.

While the example of FIG. 11a illustrates a display device 1110 comprising a tablet computer, in further examples, the display device 1110 can comprise any suitable device configured to present visual, audio and/or haptic information to a user or other computing device such as a smartphone, laptop computer, computer monitor, or the like. The surface evaluation system 1000 may use a camera of the display device 1110 to take images and/or video of the surface 1001 in various embodiments. For example, in some embodiments, an off-the-shelf planar tablet computer can be used, which can comprise a screen on a front face and one or more cameras on an opposing face. Such a tablet can be coupled to the light box 1120 such that the screen is visible by a user and such that the one or more cameras of the tablet are directed within the cavity 1130 of the surface evaluation system 1000 and can view a target surface. Accordingly, in various embodiments, the light box 1120 can have suitable openings that allow one or more cameras of a tablet or other suitable device to be used for evaluating the target surface, with the screen of the tablet being externally visible and/or usable by an operator.

The display device 1110 may also allow for the operator to record information on measurements or data obtained by the surface evaluation system 1000, for example the operator may record a classification of defects in order to create a library and to label measurements for system improvement. The surface evaluation system 1000 may use a processing board to evaluate the images real-time and provide quality results as well as record and process the operator feedback.

The display device 1110 can be operably coupled to an automated finishing system 100 in some examples (e.g., via wired or wireless connection), and can receive data from systems such as a controller system 322 (see FIG. 3). In various examples, the display device 1110 can be an evaluation device 480 (see FIG. 4).

As discussed herein, a surface evaluation system 1000 can have various suitable configurations, so the examples of FIGS. 10, 11a and 11b should not be construed to be limiting. Moreover, in further embodiments, any suitable elements can be interchangeable between the examples of FIGS. 10, 11a and 11b or any such elements can be absent.

In an embodiment, the finish or other conditions of the test surface 1001 can be evaluated by shining a light 1020 on the target surface 1001 at an incident angle. The orientation of the light 1020 relative to the target surface 1001 can highlight the topography of the target surface 1001, which can include various imperfections, features, or other finish parameters. In one embodiment, a light 1020 is shone at an adjustable angle to the test surface 1001 and a camera 1050 and/or scanner 1060 captures one or more images of the test surface 1001 as illuminated by the light 1020. The angle of the light 1020 relative to the test surface 1001 as well as the angle of the camera 1050 and/or scanner 1060 relative to the test surface 1001 or the light 1020 can be controlled manually or by utilizing an actuator (e.g., controlled automatically by the surface evaluation system 1000 and/or by a controller of an automated finishing system 100). Such an actuator can include a servo motor, step motor, hydraulic or pneumatic cylinders, a linear stage, rotary stage, or the like.

Different wavelengths of light may be used to highlight the topography of the test surface 1001 in accordance with some embodiments. Additionally, in various embodiments, multiple images can be captured by the camera 1050 and/or scanner 1060 under different lighting conditions and different angles. For example, the surface evaluation system 1000 in some examples can simulate different ambient lighting conditions by modulating the light and the incident angle of the light projected on the test surface 1001. The surface evaluation system 1000 can include multiple lights 1020 to simulate lighting from above, below, either side, or any suitable angle in between.

Images and/or video collected by the surface evaluation system 1000 (e.g., via one or more cameras 1050 and/or scanners 1060) can be processed to highlight topography, features, defects, patterns, and the like. Hue, saturation, contrast, color of the images, and the like may be adjusted. Grayscale images and edge detection may be used in some examples. Texture analysis may also be used in some examples to capture the topography features by projecting light patterns onto the test surface 1001 and a high-resolution camera 1050 can be used to capture images of the reflected patterns from the test surface 1001 being measured and determine deformations. The surface evaluation system 1000 may use a combination of multiple cameras 1020 and an LED matrix as sensors in one embodiment. In some examples, the surface evaluation system 1000 can also use infrared (IR) cameras or filters to simulate a spectral camera of any wavelength for image capture. In further examples, the surface evaluation system 1000 can use multispectral or hyperspectral imagery for surface measurements.

In some examples, the surface evaluation system 1000 can utilize contact and/or non-contact profilometry sensors to capture the profile and topography of the test surface 1001. These sensors can include contact sensors which directly capture a surface profile of the test surface 1001 (e.g., the TalySurf surface profile measuring machine). Non-contact sensors such as optical profilometers can be used in some examples. Optical profilometry methods that may be used in some examples can include laser triangulation, confocal microscopy, low coherence interferometry, digital holography, and the like.

In some embodiments, tinted coatings (e.g., joint compound, paint, and the like) can be used to help highlight topography of a target surface 1001. For example, such a coating can be applied to a surface by the surface finishing system 100, can be part of a substrate such as drywall, applied manually, or in any other suitable way. In one embodiment, a coating is tinted such that when the coating is sanded or polished the coating changes color. For example, the change in color may be achieved by removing the top layer which is tinted. Such a color change may also be achieved in some examples with tints that rise to a top layer of coating as the coating dries.

In various embodiments imaging systems (e.g., one or more cameras 1050 and/or scanners 1060) can be used to detect areas that have not been treated, sanded, or polished by identifying areas of different color. The surface evaluation system 1000 can use shadow sanding where a light 1020 is placed at a shallow angle relative to the test surface 1001 which can result in features such as high and low spots casting shadows and such shadows can be identified by the surface evaluation system 1000. As the test surface 1001 is treated the shadows can be monitored to show the effect of the treatment in reducing or eliminating high and low spots.

For example, a surface finishing system 100 can sand a surface of dried joint compound (e.g., via a sanding end effector 160S), and instructions for such sanding can be based on monitoring of shadows and/or colors of the surface (e.g., via a surface evaluation system 1000) while sanding is performed. Data obtained from the surface evaluation system 1000 can be used to direct a sanding end effector 160S to high spots that need to be sanded down; to avoid low spots that would not benefit from being sanded down; and to end a sanding task when a determination is made that the surface being sanded meets or exceeds a threshold for surface quality based surface roughness, sheen, reflectivity, planarity, texture, porosity, number and size of defects, or any other suitable measurement or surface condition. A similar method can be applied during treatment or generation of a surface, including coupling drywall to studs, applying joint compound to seams and/or the surface of drywall pieces, monitoring joint compound as the joint compound dries, sanding dried joint compound, painting a surface, and the like.

In some embodiments, a surface evaluation system 1000 can use thermal imaging, contact and/or infrared thermometer readings to capture the finish of the test surface 1001. For example, after a coating is applied to a wall, the temperature of the coated wall can be cooler due to water or other solvent in the coating. A thermal measurement can be used to detect areas of the wall that have already been coated; can be used to detect areas with a thinner coating; can be used to detect areas where a wet seam or joint was covered, and the like. Temperature measurements may be used to correspond temperature to coating thickness, and in some examples, ambient measurements and calibration can be used to increase the accuracy of the thickness estimate.

In some embodiments, a coating can be heated (e.g., by heating the coating during or after application to a surface, via an exothermic reaction in the coating, and the like) where it is desirable to detect the coating by the coating being hotter than the surrounding materials. The surface evaluation system 1000 can detect exothermic processes in some examples by using thermal measurements to find the hot areas that correspond to an exothermic process. Such an exothermic process can include plaster, hot or setting joint compound, insulation, sealants, and the like. Such an exothermic reaction can be generated by the coating alone, by a reaction between the coating and a surface the coating is applied to, by a reaction between the coating and a material applied to the coating, and the like. In various examples, thermal measurements can be used to detect and establish how much the coating has dried or set and when the coating is dry or set.

In some embodiments, a surface evaluation system 1000 can use conductivity measurements to determine the finish quality of a test surface 1001. Conductivity measurement can be used in various embodiments to measure the thickness of a coating applied over a conductive surface. Using drywall and wall assembly construction as an example, conductivity measurements can be done at the studs to establish a thickness of a drywall board coupled to the studs and a coating applied to the drywall board. Conductive coatings can be used in some embodiments, and the thickness of such a conductive coating on a surface can be measured via conductivity sensors, or the like. A conductive additive can be added to a coating in some embodiments to improve finish and/or to enable conductivity measurements. The water or other solvent content of a coating can be measured using a conductivity sensor in various embodiments. For example, as water in a coating evaporates and the coating dries, the conductivity of the coating can decrease and determining when the coating is dry (e.g., has reached a moisture threshold defined as being "dry") can be done by monitoring and measuring the conductivity of the surface.

In some embodiments, a surface evaluation system 1000 can use one or more structured light cameras (e.g., comprising lights 1020, camera 1050 and/or scanner 1060) to determine the topography of the test surface 1001. For example patterns of light (e.g., via lights 1020, camera 1050 and/or scanner 1060) can be projected on the test surface 1001 and a camera (e.g., camera 1050 and/or scanner 1060)

can be used to capture the resulting pattern. Deformations of the pattern can correspond to three-dimensional features of the test surface 1001 and the relative deformation can be used to establish the shape, projection, height, and size of such feature or defect of the test surface 1001. In some embodiments, the surface evaluation system 1000 can utilize a scanner 1060, or the like, to capture the topography of the test surface 1001 before, during, and after tasks are completed. The scanner 1060 can use various suitable techniques including one or more of, laser triangulation, structured light, photogrammetry, contact, laser pulse, and the like.

In some embodiments, evaluation of the quality of a surface can include use of a calibration system and a reference system. For example, the reference system can include a first set of one or more reference sensors that can act as a reference and the calibration system can include a second set of one or more calibration sensors that can be calibrated to the reference.

In some examples, the calibration system can comprise sensors that are too large, too expensive, too fragile, too slow, too small a field of view or consume too much power to be used in field operations. Accordingly, in some examples, the calibration system can be located remotely compared to the reference system, a surface evaluation system 1000, a surface finishing system 100, and the like.

The set of one or more reference sensors can be used to calibrate measurements from one or more field sensors. For example, in one embodiment, a camera 1050 can be a field sensor that is calibrated to the measurements taken by a 3D scanner or profilometer. The calibration system can be used to collect data from a variety of samples that contain different features and defects. The 3D scanner can provide the topography of the feature or defect while the camera captures an image of the lit feature. The topography measurement can be correlated to the shadows on the image. This method can be part of a machine learning system were the data from the profilometer is used to label a data set of images. The labelled images can be used to train a machine learning model to recognize features or defects using the camera images. The incident light angle and wavelengths of the light may be controlled to find the parameters that give the best contrast for a given feature or defect. Multiple images of the same area of a surface may be taken at different angles and under different lighting conditions to facilitate feature identification. A training set of images of a training surface may be collected under different lighting conditions to create a model that can identify features of field surfaces under different lighting conditions. The data set for the model may also be labeled by a person with experience in the finishing task.

In various embodiments, a surface evaluation system 1000 and methods associated therewith can be used before, during and after a step or process is completed (e.g., drywalling tasks). As discussed herein, the surface evaluation system 1000 can be part of an automated drywalling system 100 used to automate a finishing task such as finishing drywall, plaster, stucco, cement, painting, and the like. In various examples, data collected by the surface evaluation system 1000 be used to inform automated finishing system 100. For example, data collected from a test surface 1001 can inform if an additional pass is needed to achieve a desired coating thickness, polish and/or sanded profile. The surface evaluation system 1000 may be used to inform automated finishing system 100 can capture surface quality data during a task, which can enable the automated finishing system 100 to adjust parameters such as force, dwell time, speed, acceleration, overlap, pressure, revolutions per minute, approach angle of the tool, among others, to improve the finish of the process. The toolpaths of the automated finishing system 100 can also be updated given the measurements of finish quality collected or generated. The surface evaluation system 1000 can be used to capture where a tool (e.g., mudding tool, sanding tool, painting tool, and the like) has already been, which can enable the automated finishing system 100 to correct for positioning errors. In one embodiment, when a mobile base and/or vertical stage of and automated finishing system 100 are repositioned, the surface evaluation system 1000 can be used to obtain a measurement of the current position relative to the previous toolpath. This information can be used to estimate the position of the mobile base or manipulator of the automated finishing system 100 relative to a previous workspace. A light or laser can be mounted on the base or manipulator of the automated finishing system 100 to serve as a reference point for the surface evaluation system 1000 to compare the current base or manipulator position relative to the toolpath and features detected by the surface evaluation system 1000.

Data captured by the surface evaluation system 1000 can be processed using a machine/deep learning model in some embodiments. For example, such data can be labeled according to the quality of finish and the process parameters under which it was completed. The machine learning model can then be used to create a process model that correlates the different process and system parameters to the quality of finish. The results from the data collected and the machine learning model may be used to tune process and system parameters of an automated finishing system 100 as well as to change toolpaths, order of operations and/or optimal base positions of the automated finishing system 100. Similarly, the surface evaluation system 1000 and associated methods can utilize data from the automated finishing system 100 to inform the surface quality measurements. In one embodiment, the automated finishing system 100 reports the orientation of a tool during a finishing task and the surface evaluation system 1000 can use this information to decide which incident light angle and orientation to use to highlight the worst lighting condition (e.g., to control one or more lights 1020). The surface evaluation system 1000 can use information about a room that the automated finishing system 100 is operating in; about surface planned lighting conditions, or the like, and can recreate that condition (e.g., with lights 1020) during evaluation of the test surface 1001 via the surface evaluation system 1000. For example, in some embodiments, the surface evaluation system 1000 can recreate lighting conditions that simulate lighting conditions of an entire day, portion of a day, during different seasons, with or without room lighting, and the like, to ensure that the surface quality meets prescribed tolerances at any time under expected conditions. The expected lighting conditions may also determine the toolpaths and order of operations performed by an automated finishing system that result in the best or a desired surface finish.

A surface evaluation system 1000 in some embodiments, can be part of a larger system that informs a worker on how to finish a surface. For example, surface evaluation system 1000 may highlight areas of rework to the worker and/or to an automated finishing system 100 (e.g., visually or electronically). The data collected from a test surface 1001 via the surface evaluation system and subsequent analysis can provide for generation of a task list for an operator that includes areas of rework or further evaluation. In some examples, an augmented reality system may be used to help identify the evaluation and rework areas for the worker.

Such an augmented reality system can use screens, projectors, lasers, augmented glasses, and the like, to pinpoint or indicate where the surface evaluation system 1000 should be positioned on or proximate to a surface 1001 or where the worker should to do additional work on the surface 1001 to achieve a desired finish. In some examples, a light can be directed at a target area on a surface and the color of the light can change to indicate when the area of the surface has achieved a desired finish quality. Similarly, in some embodiments, the surface evaluation system 1000 can make a noise, vibrate, or turn off a work tool, or the like, when a desire finish is achieved. In various embodiments, the surface evaluation system 1000 can be continuously monitoring the finish of a surface.

The feedback may be given through a tablet or other suitable device that can utilize features in the environment to correspond the surface evaluation system results to the current image captured by the camera on the tablet. These features include, but are not limited to, edges, corners, holes, windows, doors, electrical boxes, pipes, ceiling or floor features and the like. The surface evaluation system 1000 may also use the texture of a target surface to localize. The surface evaluation system 1000 may identify specific patterns in the texture and use these patterns to identify the same spot. For example, as an operator scans the surface with the tablet, the results from the system, which may be an annotated image, can be overlaid over the live feed. This way the operator can be able to locate the areas in need of rework. The operator may introduce reference features to the environment to facilitate the correlation between images. These features can include but are not limited to projections such as lines or other features, stickers that are placed on surfaces or objects, marks on the floor or ceiling, and the like. The surface evaluation system 1000 may also use an external position reference system like a Total Station to locate the tablet relative to a base unit. The base unit can be used to track the location of the surface evaluation system 1000 while the surface evaluation system 1000 is collecting data, which can enable the tablet display to correspond the feedback to the location where the measurement or image was collected. Similarly, a base station can be used to track tools used to finish a wall, which can include one or both of manual and robotic tools. The toolpaths and finish parameters at a particular spot on the surface can then be correlated in location to the measurements and images taken by the surface evaluation system 1000.

The surface evaluation system 1000 may be used before, during and after a task associated with a surface (e.g., a finishing task, coating task, drywalling task, or the like) to evaluate the quality of the surface. Data collected by the surface evaluation system 1000 before the task may be used to inform the toolpath and parameters of an automated finishing system 100 to treat the surface as required to meet the prescribed surface finish. Data collected by the surface evaluation system 1000 during and after the task may be used to determine if parameters and toolpaths of the automated finishing system 100 need to be updated and/or to provide feedback to an operator of the automated finishing system 100. Feedback to the operator may be provided in various suitable ways, including highlighting areas of a surface that do not meet a prescribed surface finish tolerance. The feedback may also be given directly to the automated finishing system 100 to tune the automated finishing system 100 to achieve the desired finish.

The surface evaluation system 1000 may use information from architectural drawings and specifications, floor plans, BIM models, and the like, to determine the specified or mandated surface finish on the different target surfaces. The surface evaluation system 1000 may access the information for a specific surface and dictate how the autonomous finishing system 100 targets or performs tasks on the surface as well as set the target finish quality for the surface evaluation system 1000. The surface evaluation system 1000 and the autonomous finishing system 100 may automatically determine the required surface finish and surface finishing toolpath and parameters based on the lighting conditions indicated on architectural drawings, floor plans, BIM models, and the like. This information can include, but is not limited to, location of doors, windows, skylights, lighting fixtures as well as the location and orientation of the building and openings relative to the environment. The orientation and location of a building and openings (e.g., doors, windows, skylights, and the like) can dictate the lighting conditions expected from ambient lighting throughout the day and/or year.

The surface evaluation system 1000 and automated finishing system 100 may use a model of the lighting conditions during a day and/or throughout the year to determine how one or surface should be processed and what quality of finish is required to achieve the desired and required finish quality. The toolpaths for the autonomous finishing system 100 and finishing parameters may be tailored given the model, similarly the settings and tolerances of the surface evaluation system may be set using this environmental lighting model. Accordingly, in various embodiments, different surfaces of a room being finished can be finished in different ways (e.g., by an automated finishing system 100) based on different lighting conditions of the different surfaces or portions of surfaces. For example, in a room having two walls with different expected lighting conditions, the two walls can be finished differently based at least in part on the different expected lighting conditions.

In various embodiments, a surface quality evaluation system 1000 can be connected to the internet, a local cloud or server or memory, or the like, in which data can be stored. For example, in an embodiments, data may be uploaded to a central repository local to a worksite or remote from the work site, and in some examples, such data may be used to coordinate the work from multiple workers and/or automated finishing systems 100. For example, finish data from one system 100 may be used to update the parameters of a separate system 100 or to trigger work to be done by a separate system 100. In various examples, a third party may monitor the surface finishing data remotely and control parameters and progress of work at one or more worksites. The surface evaluation system 1000 and associated methods may be used to create a report on the quality of finish of various areas of work performed on a surface. For example, a user may request finish data at the wall, room, floor level, or the like. In various examples, the user can request and obtain an aggregate and/or average of the features or defects over a zone of a worksite, surface, wall, or the like. The surface evaluation data may also be presented as annotations of a BIM model or project plans. The surface evaluation system 1000 may automatically label surfaces in plans or BIM models by correlating the location of the surface evaluation system 1000 when a given measurement was taken with the plan or model.

In various embodiments, the automated finishing system 100, which can include a surface evaluation system 1000 can be used for finishing gypsum board, drywall, cement, stucco, plaster, in applications including drywall taping and finishing, sack and patch, cement finishing including grinding and polishing, application of insulation, application of surface textures, painting, coating, polishing, plaster application, wallpaper application, and the like.

While some examples herein include a surface evaluation system 1000 that is part of, or configured to be coupled with an automated finishing system 100, further examples can include a surface evaluation system 1000 used without being coupled to an automated finishing system 100 or with elements of a surface evaluation system 1000 being distributed about an automated finishing system 100 and/or external to an automated finishing system 100.

For example, in some embodiments, a surface evaluation system 1000 can be mounted entirely or in part on a handheld unit that an operator or worker can position relative to the test surface 1001. In some embodiments, surface evaluation system 1000 may utilize wheels, rollers, ball casters, or the like, mounted between the frame 1010 and contact surface 1001 to facilitate the movement of the finish evaluation system 1000 along the surface 1001 and avoid damage to the surface 1001. In some examples, such a handheld unit can include positioning stages for positioning individual sensors, lights, and the like, relative to each other within the surface evaluation system 1000 or relative to a frame 1010 of the surface evaluation system 1000.

Sensors and/or lights may also be mounted as groups on positioning stages in some examples. Such positioning stages may be adjusted manually and/or through actuators, which can include motors, servos, rotary stages, hydraulic and pneumatic stages, magnetic stages, and the like. Positioning stages may be encoded or marked to allow for control of the position. Positioning stages may be used to move the sensors and lights to collect multiple measurements and images of the same area from different angles and distances to the surface.

A handheld surface evaluation system 1000 can include a compliant stage between the handles 1080 and a portion of the surface evaluation system 1000 that makes contact with the test surface 1001 (e.g., the frame base 1012, actuators 1070, or the like). A compliant stage can be used to bring the surface evaluation system 1000 in direct contact with the test surface 1000 or other reference surfaces without damaging the surfaces. In various examples, a compliant stage can be instrumented to capture when contact is made with a surface test 1001 and how much the stage has moved or deflected during contact with the test surface 1001. This information may be used in some examples to establish the planarity of the test surface 1001 or to provide information to the surface evaluation system 1000 regarding the surface 1001 relative to the handheld unit, contact points, and/or system frame 1010. The information from the contact may also be used to provide feedback to the user on whether the system has been positioned to the desired distance and angle from the target surface. The contact feedback may be used to automatically trigger measurements by the surface evaluation system 1000 once a desired position is reached. For example, during a surface evaluation task, a determination can be made whether the surface evaluation system 1000 is in a proper position for evaluating a target surface 1001, and if so, the surface evaluation system 1000 can automatically be triggered to begin evaluating the target surface 1001 (e.g., by taking images and/or video of the target surface 1001, or the like).

In further embodiments, a surface evaluation system 1000 can be mounted entirely or in part on a floor stand that an operator can place in the vicinity of the target surfaces. In some examples, the surface evaluation system 1000 can remain in the room during one or more finishing steps to capture how the different steps or tasks alter the finish of the surface or the surface evaluation system 1000 can be used at the end of the process to measure the final quality of the target surface(s). The floor stand, in some examples, can include only lights that set a consistent lighting condition for the finish evaluation. The floor stand, in some examples, can be mounted on wheels to facilitate positioning, and the wheels may include a locking mechanism, or the like. The surface evaluation system 1000 may be mounted entirely or in part on a frame that can be hung from a ceiling or other overhead features in some examples. The surface evaluation system 1000 can be left in an area over several hours or days to capture the surface quality of one or more surfaces under different environmental lighting conditions (e.g., during different times of day, with room lighting, and the like).

In some embodiments, a surface evaluation system 1000 can be mounted entirely or in part on personal protective equipment, a vest, or another article worn by an operator or other user. In some examples, as the operator moves relative to one or more surfaces, the surface evaluation system 1000 can capture images and data related to the one or more surfaces, which can be processed to evaluate the finish of the surface. The operator may utilize a floor stand unit to illuminate the one or more surface and to capture data as they inspect the one or more.

In some embodiments, the surface evaluation system 1000 can use lights, lasers, displays, vibrations, sounds, and the like, to provide feedback or instructions to an operator of the surface evaluation system 1000 or an automated finishing system 100. In one example, a red light is shone until the surface evaluation system 1000 is close enough to a target surface 1001, at which point the light changes to green to visually indicate that the surface evaluation system 1000 is close enough to the target surface 1001 to perform an evaluation of the surface. The surface evaluation system 1000 can use distance 1030, contact sensors 1040, or the like, to measure the distance to the target surface 1001, which can be used to inform the user or automated finishing system 100. In one embodiment, a grid may be displayed from a separate unit to provide a user with target positions for the surface evaluation system 1000. Augmented reality systems such as glasses, projectors, screens, and the like, can be used in some examples to give a user guidance as to the location of target positions or surfaces 1001 for the surface evaluation system 1000.

As discussed herein, one or more compliant stages can part of a surface evaluation system 1000 and/or an automated finishing system 100. In some examples, compliant stages can include pneumatic systems whose compliance can be passively or actively controlled. Such compliance may be achieved in some examples using a hydraulic system and/or electromechanical stage that can use sensor readings to actively control the position of a compliant stage to maintain contact forces within allowable limits. Compliant stages in some examples can be instrumented with contact sensors including pressure sensors, force sensors, conductivity sensors, and the like, on the contact points of the surface evaluation system 1000. A compliant stage can also be instrumented with sensors that measure the distance between the ends of the stage. For example, as a compliant stage is compressed or extended the distance between ends of the stage can change. The distance between ends can be measured using encoders (e.g., optical, magnetic, incremental, absolute, quadrature, and the like), potentiometers, limit switches, hall effect sensors, flow sensors for hydraulic, pneumatic stages, and the like. A compliant stage can include displacement limits in some examples to prevent the stage from over-extending or over-compressing.

In various embodiments, the surface evaluation system 1000 can include covers or shields to create a light box around an evaluation area of a target surface 1001. For example, such covers or shields can be coupled to the frame 1010. A light box can be used to create fixed lighting conditions to enable comparison of different target surfaces 1001 and to create the ideal or desirable lighting conditions for different sensors (e.g., one or more camera 1050, scanner 160, or the like). The covers or shields can be used to block out external lights and such covers or shields can be removable and adjustable in some examples. The covers or shields can enable for bright lights to be used by the surface evaluation system 1000 without disturbing workers or other systems. The surface evaluation system 1000 in some examples can detect and record ambient lighting conditions using a photosensor, camera, or the like, so that the ambient lighting may be removed, or compensated for, in captured images or be used to adjust the calibration for different sensors (e.g., one or more camera 1050, scanner 160, or the like).

In various examples, a surface evaluation system 1000 can use a control surface or sample to calibrate the surface evaluation system 1000. For example, in one embodiment, a control surface or sample can be placed in the room and used as a reference during a calibration routine of the surface evaluation system 1000. In some embodiments, a control sample or surface can be a permanent fixture of the surface evaluation system 1000. For example, in one embodiment, a reference sample is placed in a corner of the frame base 1012 such that the sensors and/or cameras (e.g., cameras 1050 and/or scanners 160) capture both the target surface 1001 and the reference sample. This can enable the known reference sample and the target surface to be evaluated under the same conditions. The data and images from the known reference sample may be used in some examples to account for noise in measurements of the target surface 1001 and different lighting conditions on the lighting surface 1001. The known reference sample may be subtracted from target surface measurements and/or images of the target surface to establish a relative finish evaluation. A known reference sample may be used in some examples to determine if the surface evaluation system 1000 needs to be recalibrated.

In various embodiments, a surface evaluation system 1000, an automated finishing system 100 or other computing system can stitch together separate images of a target surface 1001 to create a larger image with corresponding topography data. Such stitching can allow for the full surface to be displayed to the user or ingested by the surface evaluation system 1000, an automated finishing system 100 or other computing system. Workspace data comprising a plurality of images of a target surface 1001, or portion thereof, can be stitched together in some examples by finding corresponding features between data and image sets. Such stitching may also be done using visual odometry, control points, GPS, feature tags, or other suitable method. The surface evaluation system 1000 in some examples can project or display a pattern over the target surface 1001 while capturing images and/or data to facilitate stitching of the workspaces by using the external pattern for correspondence. Motion of a mobile base, vertical stage, robotic manipulator, or other elements of an automated finishing system 100 can be used in some example to give an estimate of the relative distance between sensor readings and/or images.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated drywall finishing system comprising:
   a mobile base unit;
   a robotic arm that extends between a base end and a distal end, the robotic arm coupled to the mobile base unit at the base end of the robotic arm;
   an end effector coupled at the distal end of the robotic arm;
   a surface evaluation system comprising at least one light and one or more vision systems that generate target surface data to evaluate quality of a surface of a wall assembly, wherein the one or more vision systems take one or more surface evaluation images or surface evaluation measurements of the surfaces; and
   a computing device executing a computational planner that:
      obtains the target surface data from the one or more vision systems;
      determines based on the target surface data that a portion of the surface of the wall assembly is below a finish quality threshold;
      determines a position error of the automated drywall finishing system based at least in part on position data, wherein the position data, corresponding to a previous position of the automated drywall finishing system when the one or more surface evaluation images or surface evaluation measurements were taken, is generated based at least in part on the one or more surface evaluation images or surface evaluation measurements;
   generates instructions for driving the end effector, the robotic arm, and the mobile base unit to perform one or more drywalling tasks via the end effector based at least in part on the target surface data, the instructions including tuning parameters of at least one of the end effector, the robotic arm, and the mobile base unit to improve quality of the surface of the wall assembly based at least in part on the target surface data, and wherein the one or more drywalling tasks include finishing the portion of the surface of the wall assembly that is below the finish quality threshold, wherein the finishing improves the portion of the surface to be at or above the finish quality threshold; and
   drives, the end effector, the robotic arm, and the mobile base unit to perform the one or more drywalling based on the generated instructions.

2. The automated drywall finishing system of claim 1, wherein the one or more vision systems comprise one or more of a 3D scanner, laser scanner, and a camera.

3. The automated drywall finishing system of claim 1, wherein the at least one light is controlled by the surface evaluation system when generating the target surface data, including one or more of:
   modulating intensity of the at least one light;
   modulating a wavelength of the at least one light;
   changing an incident angle of the at least one light; and
   turning the at least one light on and off.

4. The automated drywall finishing system of claim 1, wherein at least one of the at least one light and the one or more vision systems are disposed on the end effector.

5. The automated drywall finishing system of claim 1, wherein at least one of the at least one light and the one or more vision systems are disposed on the mobile base unit.

6. The automated drywall finishing system of claim 1, wherein the computational planner generate instructions for driving the end effector, the robotic arm, and the mobile base unit to perform the one or more drywalling tasks via the end effector based further on the position error.

7. The automated drywall finishing system of claim 1, wherein the surface evaluation system configures the at least one light to simulate room lighting conditions.

8. The automated drywall finishing system of claim 1, wherein the computational planner uses wall assembly information from uploaded at least one of an architectural drawing and a building information model (BIM) to establish the finish quality threshold.

9. The automated drywall finishing system of claim 1, wherein the surface evaluation system configures the at least one light to apply a harshest lighting setting to the surface to highlight defects in the surface.

10. The automated drywall finishing system of claim 1, wherein the computational planner uses wall assembly information from uploaded at least one of an architectural drawing and a building information model (BIM) to set lighting generated by the at least one light to be representative of room lighting determined based on the wall assembly information or an environmental lighting model.

11. A method comprising:
obtaining, by a computational planner executing on a computing device of an automated drywall finishing system, target surface data from one or more vision systems of a surface evaluation system of the automated drywall finishing system, wherein:
the automated drywall finishing system comprises the surface evaluation system, a computing device excuting a computational planner, a mobile base unit, a robotic arm, and an end effector,
the robotic arm extends between a base end and a distal end,
the robotic arm is coupled to the mobile base unit at the base end of the robotic arm,
the end effector is coupled at the distal end of the robotic arm, and
the surface evaluation system comprises at least one light and the one or more vision systems that generate the target surface data to evaluate quality of a surface of a wall assembly, and the one or more vision systems take one or more surface evaluation images or surface evaluation measurements of the surface;
determining, by the computational planner, based on the target surface data that a portion of the surface of the wall assembly is below a finish quality threshold;
determining, by the computational planner, a position error of an automated drywall finishing system, based at least in part on position data, wherein the position data, corresponding to a previous position of the automated drywall finishing system when the one or more surface evaluation images or surface evaluation measurements were taken, is generated based at least in part on the one or more surface evaluation images or surface evaluation measurements;
generating, by the computational planner, instructions for driving one or more of the end effector, the robotic arm, and the mobile base unit to perform one or more drywalling tasks based at least in part on the target surface data, the instructions including ming parameters of at least one of the end effector, the robotic arm, and the mobile base unit to improve quality of the surface of the wall assembly based at least in part on the target surface data, and wherein the one or more drywalling tasks includes finishing the portion of the surface of the wall assembly that is below the finish quality threshold, and the finishing improves the portion of the surface to be at or above the finish quality threshold; and
driving, by the computational planner, one or more of the end effector, the robotic arm, and the mobile base unit to perform the one or more drywalling tasks based on the instructions.

12. The method of claim 11, wherein the surface comprises a coating and wherein the coating is tinted to highlight topography of the coating on the surface, and wherein the target surface data comprises topography data generated by the one or more vision systems detecting the topography.

13. The method of claim 11, wherein the one or more vision systems comprise a thermal imaging camera, and wherein one or more images generated by the thermal imaging camera are to identify one or more portions of the surface where a coating has been applied to the surface.

14. The method of claim 11, further comprising using building assembly information uploaded from at least one of a building drawing or a building model to establish the finish quality threshold.

15. The method of claim 11, further comprising determining a finish quality of the surface based on calibration data and one or more images generated by the one or more vision systems, and
wherein the calibration data comprises at least one of topography measurements of the surface and human labeled datasets.

16. The method of claim 11, further comprising determining a finish quality of the surface based on two or more surface finish characteristics of the surface, the two or more surface finish characteristics including at least two of:
surface texture,
surface porosity,
size and number of defects on the surface,
surface reflectivity,
surface sheen, and
surface planarity, and
wherein the determining the finish quality of the surface comprises determining whether the two or more surface finish characteristics meet a respective defined finish quality threshold for the two or more surface finish characteristics.

17. The method of claim 11, wherein the one or more vision systems comprise a thermal imaging camera, and wherein one or more images generated by the thermal imaging camera are to identify areas of different coating thicknesses applied to the surface.

18. The method of claim 11, wherein the one or more vision systems comprise a thermal imaging camera, and wherein one or more images generated by the thermal imaging camera are to determine that coating applied to the surface has dried and meets criteria to be sanded.

19. The method of claim 11, further comprising using building assembly information uploaded from at least one of a building drawing or a building model to set lighting generated by at least one light to be representative of room lighting determined based on the building assembly information or an environmental lighting model.

20. The method of claim 11, further comprising:
controlling the at least one light by the surface evaluation system when generating the target surface data, wherein the controlling includes at least one of:
modulating intensity of the at least one light;
modulating a wavelength of the at least one light; and
changing an incident angle of the at least one light.

* * * * *